(12) United States Patent
Ngo et al.

(10) Patent No.: US 12,506,733 B2
(45) Date of Patent: Dec. 23, 2025

(54) ELECTRONIC DEVICE AND METHOD FOR AUTHENTICATION IN SESSION INITIATION PROTOCOL

(71) Applicant: Samsung Electronics Co., Ltd., Suwon-si (KR)

(72) Inventors: Duy Bach Ngo, Bac Ninh Province (VN); Van Khanh Nguyen, Bac Ninh Province (VN); Van Thinh Nguyen, Bac Ninh Province (VN); Dinh Viet Anh Nhu, Bac Ninh Province (VN); Duc Cuong Vu, Bac Ninh Province (VN)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 18/171,054

(22) Filed: Feb. 17, 2023

(65) Prior Publication Data

US 2023/0353565 A1    Nov. 2, 2023

Related U.S. Application Data

(63) Continuation of application No. PCT/KR2023/001481, filed on Feb. 1, 2023.

(30) Foreign Application Priority Data

May 2, 2022    (KR) .................... 10-2022-0054489

(51) Int. Cl.
*H04L 9/40*     (2022.01)
*H04L 67/141*   (2022.01)

(52) U.S. Cl.
CPC ........ *H04L 63/0876* (2013.01); *H04L 67/141* (2013.01)

(58) Field of Classification Search
None
See application file for complete search history.

(56) References Cited

U.S. PATENT DOCUMENTS

2006/0225129 A1    10/2006 Inoue
2009/0025075 A1    1/2009  Chow et al.
(Continued)

FOREIGN PATENT DOCUMENTS

CN       102055588 A    *    5/2011
EP       1 578 101 A1         9/2005
(Continued)

OTHER PUBLICATIONS

OTP always detected and shown on lock screen, Oct. 9, 2018 https://forums.oneplus.com/threads/otp-always-detected-and-shown-on-lock-screen.922518/.

(Continued)

*Primary Examiner* — Lance Leonard Barry
*Assistant Examiner* — Mohammad Yousuf A. Mian
(74) *Attorney, Agent, or Firm* — Jefferson IP Law, LLP

(57) ABSTRACT

A method performed by an electronic device is provided. The method includes transmitting, to another electronic device through a server, a session initiation protocol (SIP) INVITE message for a connection request of a session. The SIP INVITE message includes information for indicating an authentication request. The method includes receiving, from the other electronic device through the server, a SIP information message for indicating a ringing including information for indicating an authentication support. The method includes identifying whether an SIP response message for indicating a success of the connection request is received from the other electronic device or a target electronic device for a call forwarding or not. The method includes establishing the session in response to a reception of the SIP response (Continued)

message. The reception of the SIP response message indicate an authentication success in the other electronic device or the target electronic device, according to the authentication request.

20 Claims, 19 Drawing Sheets

(56) References Cited

U.S. PATENT DOCUMENTS

| | | | |
|---|---|---|---|
| 2010/0074100 A1* | 3/2010 | Suzuki | G06F 11/2025 370/221 |
| 2014/0018040 A1 | 1/2014 | Kim | |
| 2016/0316414 A1 | 10/2016 | Yeoum et al. | |
| 2018/0295234 A1* | 10/2018 | Kumar Selvaraj | H04L 65/1059 |
| 2020/0053521 A1 | 2/2020 | Kim et al. | |
| 2021/0266750 A1 | 8/2021 | Stubblefield et al. | |

FOREIGN PATENT DOCUMENTS

| | | | | |
|---|---|---|---|---|
| EP | 2 441 227 B1 | | 6/2018 | |
| EP | 3 716 526 A1 | | 9/2020 | |
| ES | 2251291 A1 | * | 4/2006 | ........ H04M 3/42229 |
| JP | 2008033011 A | * | 2/2008 | |
| KR | 10-2005-0017741 A | | 2/2005 | |
| KR | 20050017741 A | * | 2/2005 | |
| KR | 10-2010-0123328 A | | 11/2010 | |
| KR | 10-1016277 B1 | | 2/2011 | |
| KR | 10-1065560 B1 | | 9/2011 | |
| KR | 10-1121230 B1 | | 6/2012 | |
| KR | 10-1269828 B1 | | 6/2013 | |
| KR | 10-2016-0002295 A | | 1/2016 | |
| KR | 10-1612772 B1 | | 4/2016 | |
| KR | 10-2016-0126388 A | | 11/2016 | |
| KR | 10-2017-0047736 A | | 5/2017 | |
| KR | 10-2020-0017307 A | | 2/2020 | |
| WO | WO-2007000115 A1 | * | 1/2007 | ....... H04L 29/06027 |

OTHER PUBLICATIONS

Flash SMS should not be readable when phone is locked, Jan. 24, 2014 https://together.jolla.com/question/19064/flash-sms-should-not-be-readable-when-phone-is-locked/.
Tech: SEA prefers OTP via SMS for e-payment transaction, Feb. 9, 2022 https://www.nst.com.my/lifestyle/bots/2022/U.S. Appl. No. 02/770,241/tech-sea-prefers-otp-sms-e-payment-transaction.
How to Hide Sensitive Notifications on Your Android Lock Screen, May 10, 2016 https://www.howtogeek.com/253076/how-to-hide-sensitive-notifications-on-your-android-lock-screen/.
SIP: Session Initiation Protocol, Jun. 2002 https://www.rfc-editor.org/rfc/rfc3261.html.
Key words for use in RFCs to Indicate Requirement Levels, Mar. 1997 https://datatracker.ietf.org/doc/html/rfc2119.
International Search Report dated Apr. 24, 2023, issued in International Application No. PCT/KR2023/001481.
Extended European Search Report dated Jun. 2, 2025; European Appln. No. 23799526.1-1218 / 4498656 PCT/KR2023001481.

* cited by examiner

ELECTRONIC DEVICE AND METHOD FOR AUTHENTICATION IN SESSION INITIATION PROTOCOL

CROSS-REFERENCE TO RELATED APPLICATION(S)

This application is a continuation application, claiming priority under § 365(c), of an International application No. PCT/KR2023/001481, filed on Feb. 1, 2023, which is based on and claims the benefit of a Korean patent application number 10-2022-0054489, filed on May 2, 2022, in the Korean Intellectual Property Office, the disclosure of which is incorporated by reference herein in its entirety.

TECHNICAL FIELD

The disclosure relates to a session initiation protocol (SIP). More particularly, the disclosure relates to a device and a method for authentication in SIP.

BACKGROUND ART

A session initial protocol (SIP) is a signaling protocol for managing a session or a call in multimedia communication. A caller and a callee may establish a call through a request and response of the SIP protocol. Meanwhile, the caller may make a private call to the callee. If call forwarding is set on the callee's electronic device or if the callee's electronic device is under the control of someone other than the callee, the caller may not want to connect the call.

The above information is presented as background information only to assist with an understanding of the disclosure. No determination has been made, and no assertion is made, as to whether any of the above might be applicable as prior art with regard to the disclosure.

DISCLOSURE

According to embodiments, a method performed by an electronic device is provided. The method includes transmitting, to another electronic device through a server, a session initiation protocol (SIP) INVITE message for a connection request of a session. The SIP INVITE message may include information for indicating an authentication request. The method may include receiving, from the other electronic device through the server, a SIP information message for indicating a ringing. The SIP information message for indicating the ringing may include information for indicating an authentication support. The method may include identifying whether an SIP response message for indicating a success of the connection request is received from the other electronic device or a target electronic device for a call forwarding or not. The method may include establishing the session in response to a reception of the SIP response message. The reception of the SIP response message may indicate an authentication success in the other electronic device or the target electronic device, according to the authentication request.

According to embodiments, a method performed by an electronic device is provided. The method receiving, from another electronic device through a server, a session initiation protocol (SIP) INVITE message for a connection request of a session. The SIP INVITE message may include an authentication request. The method may include transmitting, to the other electronic device through the server, a SIP information message for indicating a ringing. The SIP information message for indicating the ringing may include an authentication support. The method may include receiving a designated user input according to the authentication request. The method may include, based on the designated user input, transmitting, to the other electronic device, a SIP response message for indicating a success of the connection request.

According to embodiments, an electronic device is provided. The electronic device includes a memory, at least one transceiver, and at least one processor operably coupled to the memory and the at least one transceiver. The at least one processor may be configured to transmit to another electronic device through a server, a session initiation protocol (SIP) INVITE message for a connection request of a session. The SIP INVITE message may include information for indicating an authentication request. The at least one processor may be configured to receive from the other electronic device through the server, a SIP information message for indicating a ringing. The SIP information message for indicating the ringing may include information for indicating an authentication support. The at least one processor may identify whether an SIP response message for indicating a success of the connection request is received from the other electronic device or a target electronic device for a call forwarding or not. The at least one processor may be configured to establish the session in response to a reception of the SIP response message. The reception of the SIP response message may indicate an authentication success in the other electronic device or the target electronic device, according to the authentication request.

According to embodiments, an electronic device is provided. The electronic device includes a memory, at least one transceiver, at least one processor operably coupled to the memory and the at least one transceiver. The at least one processor may be configured to receive, from another electronic device through a server, a session initiation protocol (SIP) INVITE message for a connection request of a session. The SIP INVITE message may include an authentication request. The at least one processor may be configured to transmit, to the other electronic device through the server, a SIP information message for indicating a ringing. The SIP information message for indicating the ringing may include an authentication support. The at least one processor may be configured to receive a designated user input according to the authentication request. The at least one processor may be configured to, based on the designated user input, transmit to the other electronic device, a SIP response message for indicating a success of the connection request.

DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

Figure 1:
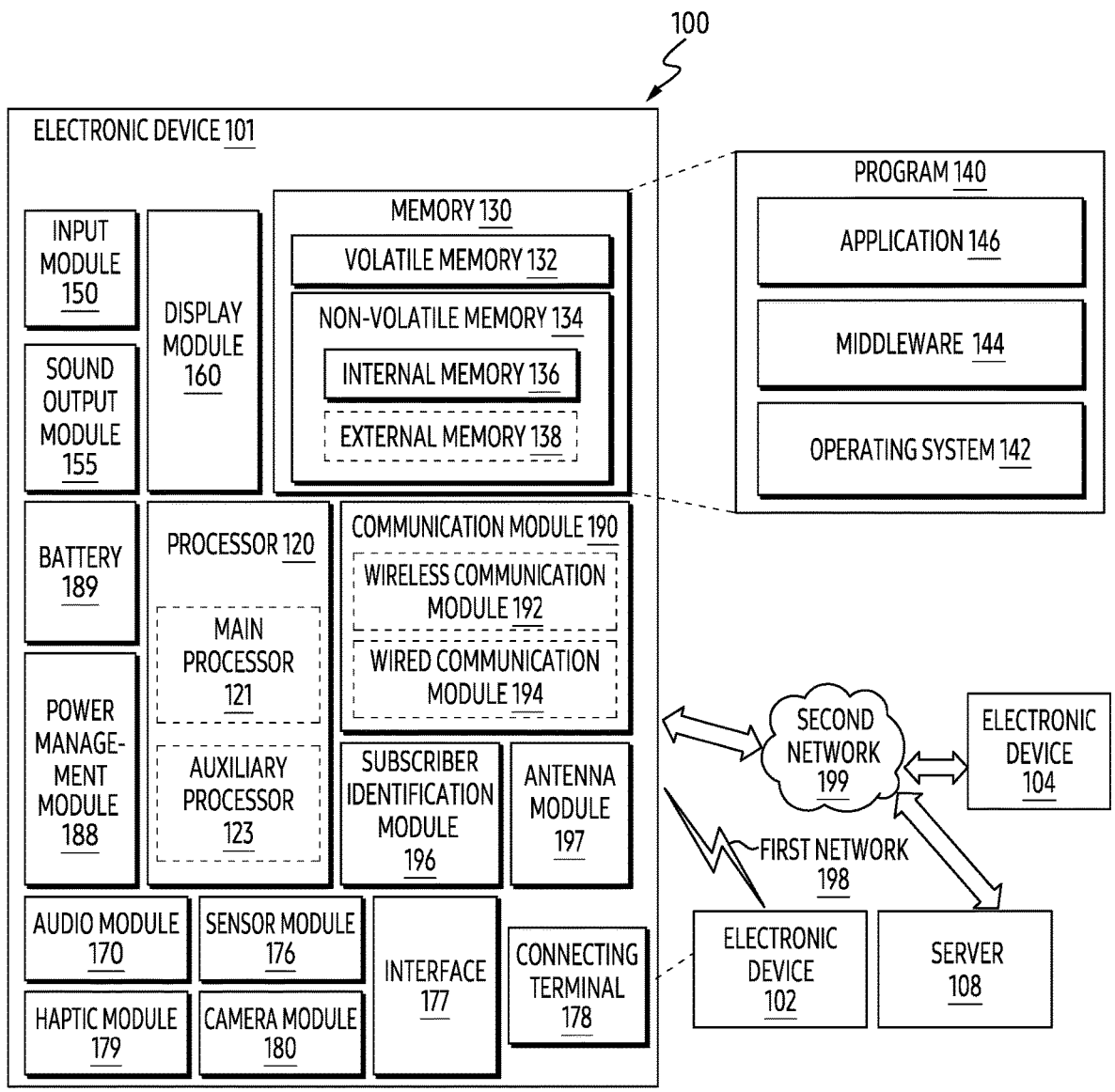
FIG. 1 is a block diagram of an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the disclosure are used only to describe specific embodiments and may not be intended to limit the scope of other embodiments. Singular expressions may include plural expressions unless the context clearly dictates otherwise. Terms used herein, including technical or scientific terms, may have the same meaning as those generally understood by those skilled in the art described herein. Among the terms used in the disclosure, terms defined in a general dictionary may be interpreted as having the same or similar meaning as the meaning in the context of the related art, and are not to be interpreted in an ideal or excessively formal meaning unless clearly defined in the disclosure. In some cases, even terms defined in the disclosure cannot be interpreted to exclude embodiments of the disclosure.

In various embodiments of the disclosure described below, a hardware approach method will be described as an example. However, since various embodiments of the disclosure include technology that uses both hardware and software, various embodiments of the disclosure do not exclude a software-based approach.

Terms referring to signals (e.g., signals, information, messages, signaling), terms referring to resources, terms for connection status (e.g., call, session), terms for calculation status (e.g., step, operation, procedure), terms referring to data (e.g., packets, user streams, information, bits, symbols, codewords), terms referring to channels, terms referring to network entities, terms referring to components of a device, and the like used in the following description are illustrated for convenience of explanation. Therefore, the disclosure is not limited to the terms to be described below, and other terms having an equivalent technical meaning may be used.

In addition, in the disclosure, expressions 'greater than' or 'less than' may be used to determine whether a specific condition is satisfied or fulfilled, but this is only a description for expressing an example and does not exclude the description 'greater than or equal to' or 'less than or equal to'. Conditions described as 'greater than or equal to' may be replaced with 'greater than', conditions described as 'less than or equal to' may be replaced with 'less than', and conditions described as 'greater than or equal to and less than' may be replaced with 'greater than and less than or equal to'.

In addition, the disclosure describes various embodiments using terms used in some communication standards (e.g., 3rd Generation Partnership Project (3GPP), extensible radio access network (xRAN), open-radio access network (O-RAN), but this is only an example for explanation. Various embodiments of the disclosure may be easily modified and applied in other communication systems.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include internal memory 136 and/or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly.

According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Embodiments of the disclosure propose a technology for performing callee authentication according to the caller's demand during session establishment, such as a situation in which a caller makes a call to a callee. By providing an adaptive authentication method to a user of a caller or callee, the caller's privacy may be protected and a phone service useful for a security call may be provided.

Figure 2:
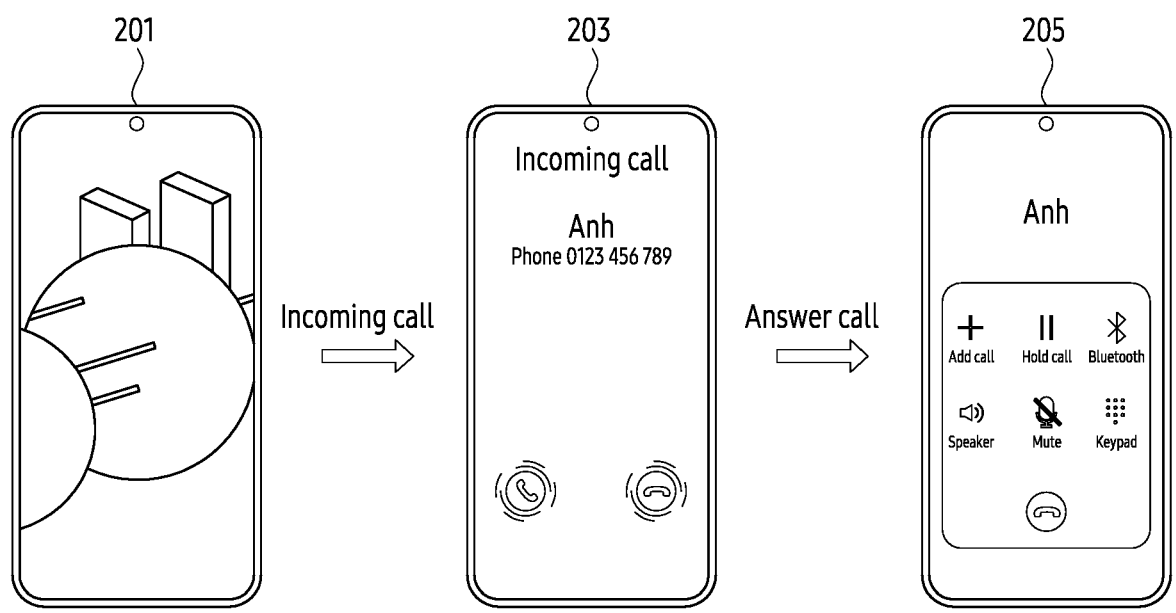
FIG. 2 illustrates an example of incoming call of a callee according to an embodiment of the disclosure.

FIG. 2 illustrates an example of incoming call of a callee according to an embodiment of the disclosure.

A situation in which a caller makes a call to a callee is described as an example. The callee's electronic device may be referred to as a callee device, and the caller's electronic device may be referred to as a caller device. The callee device and caller device illustrate the electronic device 101.

Referring to FIG. 2, when a call is received, a screen of the callee device may be switched from the first status 201 to the second status 203. Thereafter, when the call acceptance input is received by the callee device, the screen of the callee device may be switched from the second status 203 to the third status 205.

When an incoming call is detected, the callee device may provide a user with a user interface (UI)/user experience (UX) for inquiring about the acceptance of the call. The user may accept the call through an acceptance input (e.g., an input by clicking or swiping an object indicating acceptance) without a separate authentication procedure. The callee device may establish a session in response to reception of the call acceptance input. However, when the callee device receives the call, the call activity is displayed on the screen regardless of whether the callee device is locked, so anyone who is not the owner of the callee device may unlock the call or answer the call. In other words, even if the lock is set in the callee device, a session may be established without going through an authentication step for unlocking the lock.

In order to solve the above-described problem, embodiments of the disclosure propose a device and a method for performing an authentication procedure according to a caller's demand. In addition, embodiments of the disclosure propose a device and a method for solving a problem caused by an OTP-related call or a sensitive call being forwarded to another device. In addition, embodiments of the disclosure propose a device and a method for adaptively requiring an authentication procedure according to authentication requirements set by the caller instead of requiring an authentication procedure for all calls.

Hereinafter, messages required in a session initiation protocol (SIP) are defined to describe embodiments of the disclosure. The SIP controls a session to allow call control of a circuit-switched network method in a packet switching network. The SIP allows multimedia applications on the Internet of packet networks. The SIP uses a text-based addressing method in the form of URL (uniform resource locator) and E-mail.

As a network entity using the SIP protocol, a SIP client and a SIP server are defined. The SIP client may include a user agent client (UAC) and a user agent server (UAS). The UAC is located at the end of the session, and may generate a call and request setting. The UAS may accept, reject, or redirect a call from the UAC. According to an embodiment, the caller device and the callee device of the disclosure may mean the UAS, and the server may mean the UAS. The SIP server may include a proxy server, a register server, a redirect server, and a location server. Through the SIP server, the scalability of session connection may be provided.

As a message using the SIP protocol, a request message and a response message are defined. In SIP, a transaction including a request and response is required for call connection.

The SIP request may include INVITE, acknowledgment (ACK), BYE, CANCEL, OPTIONS, and REGISTER. The SIP INVITE message may be used to participate in a multimedia session. The SIP ACK message may be used to notify that a 200 OK response has been received. The SIP BYE message may be used for termination of a session. The SIP CANCEL message may be used to cancel the existing request before receiving the 200 OK response. The SIP OPTIONS message may be used to request capability from the server. The SIP REGISTER may be used to register a user device (e.g., a user agent (UA)) with a registration server.

The SIP response may include an information message, a success message, a redirection message, an error message, and a failure message. The information message corresponds to the response code of '1xx' and may be notified when the time for processing the request before the final response is 200 ms or more. For example, the information message having the response code of '100' indicates 'Trying' and indicates that the received request is being transmitted to the next server or being processed. For example, the information message having the response code of '180' indicates 'Ringing' and indicates that the callee device is ringing. In case that receiving the information message having the response code of '180', the caller device may play a ring-back tone or prepare to receive the ring-back tone. For example, the information message having the response code of '181' indicates 'Call is Being Forwarded' and indicates that a call forwarding function is set in the callee device. The target device for call forwarding is notified that a call is being attempted.

The success message corresponds to the response code of '2xx' and indicates that the request has been processed normally. For example, the information message having the response code of '200' indicates 'OK' and indicates that the request has been successfully processed. The information message having the response code of '202' indicates 'Accepted' and indicates that the processing of the request has been accepted but is still being processed.

The redirection message corresponds to the response code of '3xx' and indicates that the user is moving to a new location or user agent (UA) information is integrated into a changed service. The error message may include a message according to the error of the caller device corresponding to the response code of '4xx' and a message according to the error of the server corresponding to the response code of '5xx'. The error message indicates that the request has failed. The failure message corresponds to a response code of '6xx' and notifies failure information about the callee (e.g., the callee's status is not receiving calls).

Figure 3:
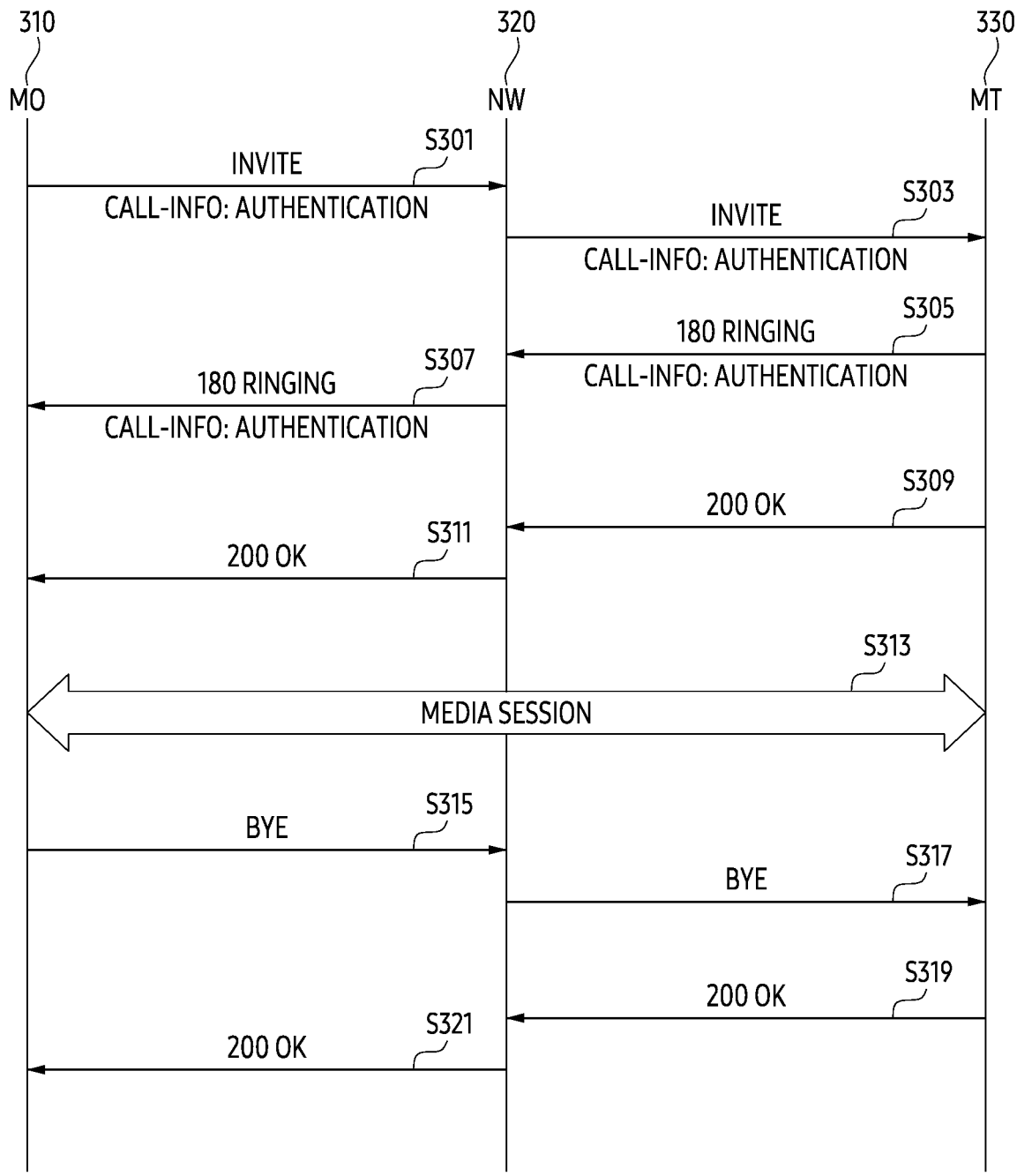
FIG. 3 illustrates an example of signaling for a call connection requesting callee authentication in a session initiation protocol (SIP) according to an embodiment of the disclosure.

FIG. 3 illustrates an example of signaling for authentication according to a demand of a caller in a session initiation protocol (SIP) according to an embodiment of the disclosure.

The callee's electronic device is a mobile termination (MT) and may be referred to as a callee device. The caller's electronic device is a mobile originator (MO) and may be referred to as a caller device. The callee device and the caller device illustrate the electronic device 101.

Referring to FIG. 3, in operation S301, the caller device 310 may transmit a SIP INVITE message to the network device 320. The caller device 310 may make a call to the callee device 330 through the network device 320 (e.g., server). The caller device 310 may determine to make a call including an authentication request according to the caller demand, to the callee device 330. The caller device 310 may generate the SIP INVITE message including the authentication request. The caller device 310 may transmit the SIP INVITE message including an authentication flag to the callee device 330. For example, a user of the caller device 310 may generate the SIP INVITE message for making a call including the authentication request through a designated input. The SIP INVITE message may indicate the authentication request. According to an embodiment, the call information (Call-info) field of the header of the SIP INVITE message may include information for indicating the authentication request.

In operation S303, the network device 320 may transmit the SIP INVITE message to the callee device 330. The SIP INVITE message may indicate the authentication request. According to an embodiment, the call information (Call-info) field of the header of the SIP INVITE message may include information for indicating the authentication request.

In operation S305, the callee device 330 may transmit a SIP response message to the network device 320. The callee device 330 may process the SIP INVITE message. The callee device 330 may respond to the caller device 310 to indicate an authentication support. The callee device 330 may generate the SIP response message indicating the authentication support. The SIP response message may indicate ringing of the callee device 330. The code number of the SIP response message may be 180. According to an embodiment, the call information (Call-info) field of the header of the SIP response message may include information for indicating the authentication support.

In operation S307, the network device 320 may transmit the SIP response message to the caller device 310. The SIP response message may indicate the ringing of the callee device 330. The code number of the SIP response message may be 180. The SIP response message may include information indicating that callee authentication according to the caller demand is supported. According to an embodiment, the call information (Call-info) field of the header of the SIP response message may include information for indicating the authentication support.

In operation S309, the callee device 330 may transmit the SIP response message to the network device 320. According to an embodiment, in order to transmit the SIP response message, the callee device 330 may identify an authentication method. For example, user setting for authentication may include a pattern input. For another example, the user setting for authentication may include a password. For still another example, the user setting for authentication may include fingerprint recognition. For still another example, the user setting for authentication may include iris recognition.

According to an embodiment, the callee device 330 may identify whether authentication is successful based on the user setting. For example, when the received fingerprint input is the same as the fingerprint information stored in the callee device 330, the callee device 330 may identify the success of authentication. For example, when the received password input is the same as the password information stored in the callee device 330, the callee device 330 may identify the success of authentication. For example, when the received iris input is the same as the iris information stored in the callee device 330, the callee device 330 may identify the success of authentication. For example, when the received pattern input is the same as the pattern information stored in the callee device 330, the callee device 330 may identify the success of authentication. The callee device 330 may generate the SIP response message indicating the success of the connection based on identifying the success of the authentication. Meanwhile, when the user authentication fails, the callee device 330 may continue to ring. The callee device 330 may repeatedly transmit the SIP response message corresponding to '180 Ringing' to the caller device 310. The callee device 330 may repeatedly request authentication from the user to retry the authentication procedure. According to an embodiment, a time limit of the retry may be set.

The step of requesting authentication from the user may be continuously performed with the step of determining acceptance or rejection of the call. According to an embodiment, when an acceptance input of the call is received, the callee device 330 may request authentication from the user. The callee device 330 may display a UI for requesting an authentication input from the user. According to another embodiment, even when an input for rejecting a call is received, authentication may be requested from the user. In other words, the callee device 330 may request authentication of the user in the input of both acceptance and rejection of the call. Here, authentication is to confirm that the subject providing the input is the owner of the callee device 330. According to another embodiment, the callee device 330 may request authentication from the user before requesting the acceptance input or the rejection input of the call. When receiving the SIP INVITE message including the authentication request, the callee device 330 may request authentication from the user, as in operation S303. Thereafter, when the authentication of the user is completed, the callee device 330 may display a UI for inquiring the acceptance input or the rejection input of the call.

When authentication is successful through the above-described procedures, the callee device 330 may generate the SIP response message. In other words, when the callee authentication according to the caller demand is completed, the SIP response message may be transmitted from the callee device 330. The SIP response message may indicate success of a connection request. The code number of the SIP response message may be 200.

In operation S311, the network device 320 may transmit the SIP response message to the caller device 310. The SIP response message may indicate the success of the connection request. The code number of the SIP response message may be 200. The caller device 310 may identify that the user authentication is completed in the callee device 330 based on the SIP response message.

In operation S313, the caller device 310 may establish a media session with the callee device 330. Thereafter, the caller device 310 and the callee device 330 may exchange data packets through the established media session. For example, the caller device 310 and the callee device 330 may perform a Voice over Internet Protocol (VoIP) call.

In operation S315, the caller device 310 may transmit the SIP request message to the network device 320. The SIP request message may indicate the termination of the call in the caller device 310. In operation S317, the network device 320 may transmit the SIP request message to the callee device 330. The callee device 330 may identify that the caller device 310 has requested the termination of the call.

In operation S319, the callee device 330 may transmit the SIP response message to the network device 320. The SIP response message may indicate success of the termination request. The code number of the SIP response message may be 200. In operation S321, the network device 320 may transmit the SIP response message to the caller device 310. The SIP response message may indicate the success of the termination request. The code number of the SIP response message may be 200.

Referring to FIG. 3, the termination of the call by the caller device 310 is initiated, but it goes without saying that the termination of the call may be initiated by the callee device 330.

Figure 4:
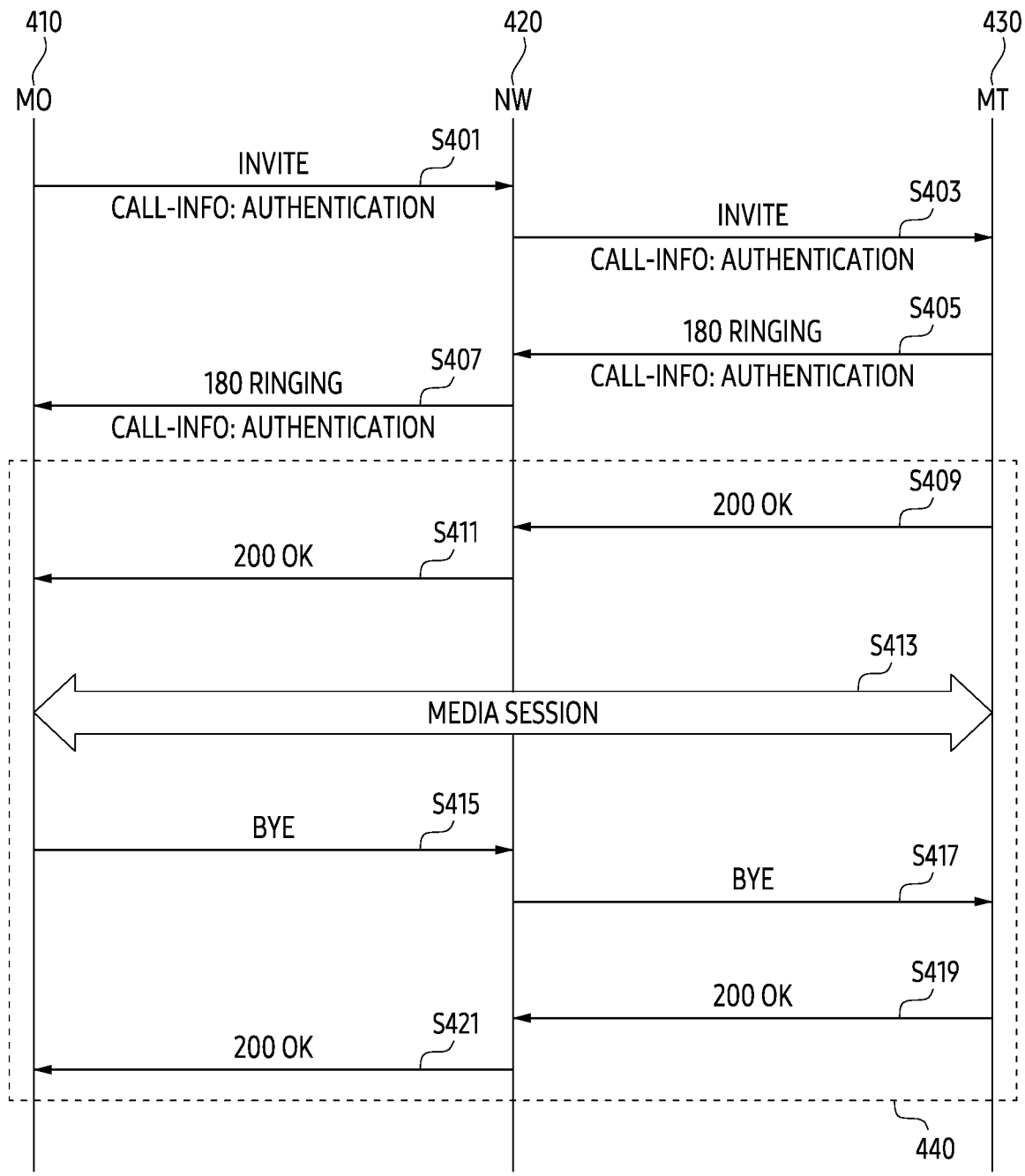
FIG. 4 illustrates another example of signaling for call connection for requesting callee authentication in a SIP according to an embodiment of the disclosure.

FIG. 4 illustrates another example of signaling for call connection for requesting callee authentication in a SIP according to an embodiment of the disclosure.

The callee's electronic device is a mobile termination (MT) and may be referred to as a callee device. The caller's electronic device is a mobile originator (MO) and may be referred to as a caller device. The callee device and the caller device illustrate the electronic device 101. FIG. 4 describes a call processing method in case that the callee device does not support an authentication function according to a caller demand or when the callee device does not have a security setting.

Referring to FIG. 4, in operation S401, the caller device 410 may transmit a SIP INVITE message to the network device 420. The caller device 410 may make a call to the callee device 430 through the network device 420 (e.g., server). The caller device 410 may generate the SIP INVITE message including an authentication request according to the caller demand to the callee device 430. Operation S401 corresponds to operation S301 of FIG. 3, and the description described in operation S301 of FIG. 3 may be applied to the caller device 410, the network device 420, and the callee device 430 in the same manner.

In operation S403, the network device 420 may transmit the SIP INVITE message to the callee device 430. Operation S403 corresponds to operation S303 of FIG. 3, and the description described in operation S303 of FIG. 3 may be applied to the caller device 410, the network device 420, and the callee device 430 in the same manner.

In operation S405, the callee device 430 may transmit the SIP response message to the network device 420. The callee device 430 may process the SIP INVITE message. The callee device 430 may transmit a response message that does not include an authentication status. The callee device 430 may generate the SIP response message without the authentication status in case that the callee device 430 does not support the authentication function according to the caller demand or does not have the security setting (e.g., setting for unlocking a screen). This is because the authentication status cannot be defined. According to an embodiment, the call information (Call-info) field of the header of the SIP response message may be set not to include any information.

In operation S407, the network device 420 may transmit the SIP response message to the caller device 410. The SIP response message may indicate ringing of the callee device 430. The code number of the SIP response message may be 180. According to an embodiment, the call information (Call-info) field of the header of the SIP response message may be set not to include any information.

The caller device 410 may receive the response message that does not include the authentication status. In case that the callee device 430 does not support the authentication function before session establishment or the authentication method is not set in the callee device 430, the caller device 410 may perform call processing such as call maintenance or termination by a user. According to an embodiment, the caller device 410 may display a UI for inquiring the user of the caller device 410 about maintaining or terminating the call. Depending on the input received by the caller device 410, the caller device 410 may wait for the SIP response message indicating '200 OK' or transmit the SIP request message indicating 'BYE'. According to another embodiment, the caller device 410 may maintain or terminate the call according to a user setting. For example, in case that the call is maintained, the caller device 410 may display on the screen of the caller device 410 that the call is changed from a security call to a normal call. For another example, in case that the call is terminated, the caller device 410 may transmit the SIP request message indicating "BYE." The user setting may be defined in advance in the settings menu of the caller device 410 or input in a UI during the call.

In case that the caller device 410 wants to maintain the call on the normal call even if there is no user authentication in the callee device 430, the caller device 410 may wait for the SIP response message indicating '200 OK'. The caller device 410 may perform a subsequent procedure 440.

In operation S409, the callee device 430 may transmit the SIP response message to the network device 420. The SIP response message may indicate success of a connection request. The callee device 430 may display a UI for inquiring about acceptance or rejection of the call without the step of requesting authentication. When receiving the acceptance input of the call on the UI, the callee device 430 may generate the SIP response message. Meanwhile, unlike illustrated in FIG. 4, when the device 430 receives the rejection input of the call on the UI, the callee device 430 may generate the SIP response message notifying the rejection of the call.

In operation S411, the network device 420 may transmit the SIP response message to the caller device 410. The SIP response message may indicate the success of the connection request. The code number of the SIP response message may be 200. The caller device 410 may identify that user authentication is completed in the callee device 430 based on the SIP response message.

In operation S413, the caller device 410 may establish a media session with the callee device 430. Thereafter, the caller device 410 and the callee device 430 may exchange data packets through the established media session. For example, the caller device 410 and the callee device 430 may perform a Voice over Internet Protocol (VoIP) call.

In operation S415, the caller device 410 may transmit the SIP request message to the network device 420. The SIP request message may indicate the termination of the call in the caller device 410. In operation S417, the network device 420 may transmit the SIP request message to the callee device 430. The callee device 430 may identify that the caller device 410 has requested the termination of the call.

In operation S419, the callee device 430 may transmit the SIP response message to the network device 420. The SIP response message may indicate the success of the termination request. The code number of the SIP response message may be 200. In operation S421, the network device 420 may transmit the SIP response message to the caller device 410. The SIP response message may indicate the success of the termination request. The code number of the SIP response message may be 200.

In FIG. 4, the termination of the call by the caller device 410 is initiated, but it goes without saying that the termination of the call may be initiated by the callee device 430.

Figure 5:
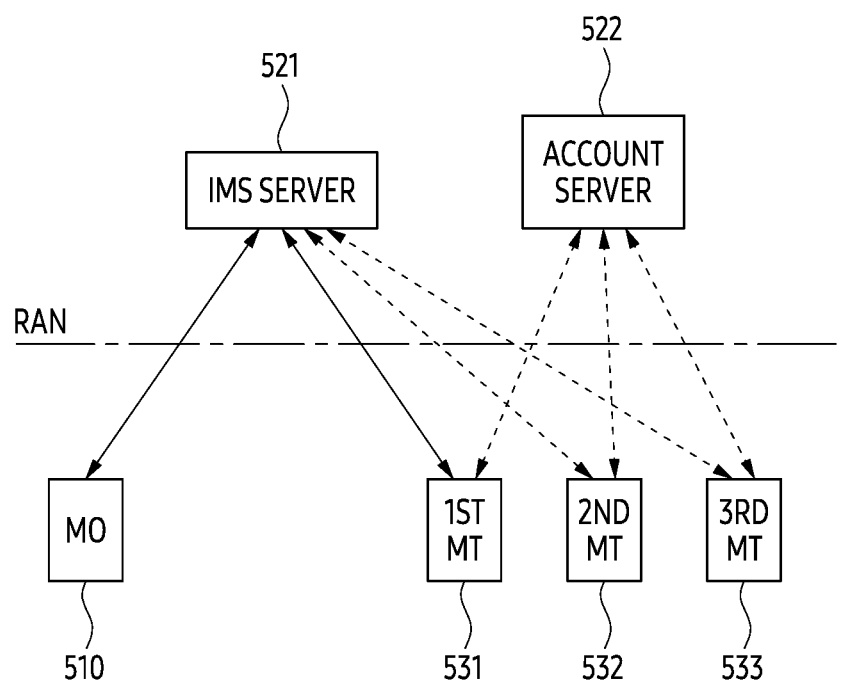
FIG. 5 illustrates an example of a server for call connection requesting callee authentication according to an embodiment of the disclosure.

FIG. 5 illustrates an example of a server for call connection requesting callee authentication according to an embodiment of the disclosure.

The callee authentication procedure according to the demand of the caller may be performed in combination with call forwarding.

Referring to FIG. 5, management of an authentication setting status may be performed by the server. According to an embodiment, the server may include an internet protocol (IP) Multimedia Subsystem (IMS) server 521. In addition, according to an embodiment, the server may include an account management server (e.g., a Computer-Mediated Communication (CMC) server, a Rich Communication Service (RCS) server) of a business operator or OEM. According to an embodiment, selection of a target electronic device for call forwarding may be performed by a callee device or by a network entity of a network. In order to select the target electronic device for call forwarding, the account management server 522 may be introduced into the authentication procedure.

Hereinafter, a situation in which the caller device 510 makes a secure call to the first callee device 531 is assumed. The security call may require authentication of the first callee device 531. In case that the first callee device 531 does not support authentication or does not have the authentication setting, the security call may forward the call to the second callee device 532 as the next callee device. The next callee device means the target electronic device set for call forwarding. The call forwarding may be performed through the account management server 522. The operation of the callee device described through FIGS. 3 and 4 may be applied to the next callee device (e.g., the second callee device 532) in the same manner.

According to an embodiment, the second callee device 532 may perform the callee authentication according to a caller demand. The second callee device 532 may transmit the SIP response message to the caller device 530 through the IMS server 521. The second callee device 532 may transmit the SIP response message which is for indicating that authentication of the second callee device 532 is completed. Here, the SIP response message may include '200 OK' indicating success of the request. Meanwhile, according to an additional embodiment, instead of the first callee device 531, the second callee device 532 may transmit the SIP response message indicating an authentication support. The code of the SIP response message indicating the authentication support may indicate '180 Ringing'. The second callee device 532 may transmit the SIP response message indicating the authentication support before the SIP response message indicating the success of the request. Accordingly, even if the security call is forwarded to the second callee device 532, the caller device 510 may determine whether to maintain the call request to the second callee device 532 or terminate the call request. This is because the user of the caller device 510 may not want the security call with the second callee device 532.

As with the first callee device 531, the call forwarding may be set in the second callee device 532. In case that the user of the second callee device 532 is non-response, the security call may be call forwarded to the third callee device 533. The description of the operation of the second callee device 532 after call forwarding may be applied to the third callee device 533 in the same manner.

As described above, even though notification of a call is performed on the device closest to the user, the call may be configured to be allowed only on the authenticated device. Accordingly, the privacy of the caller device 510 may be protected, and the reliability of the security call between the caller and the callee may be increased.

Figure 6:
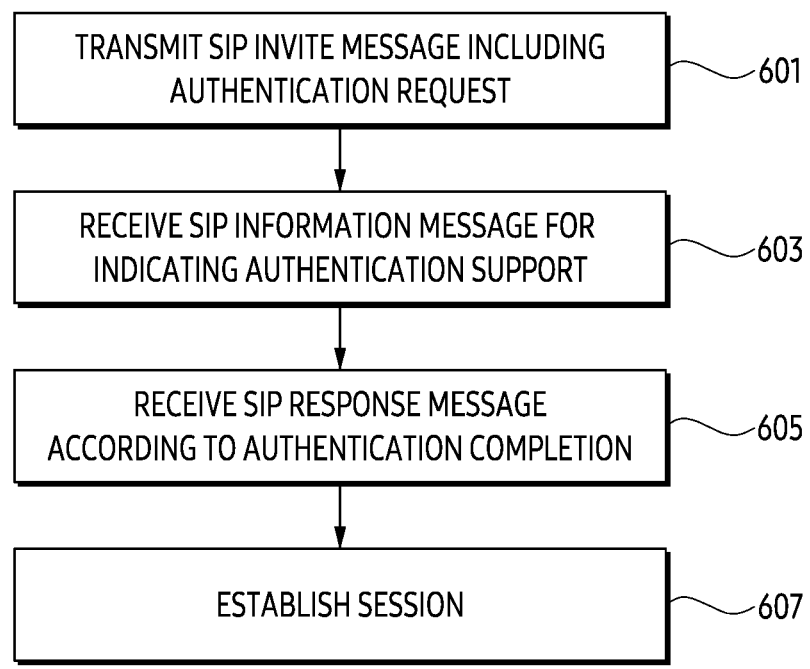
FIG. 6 illustrates an operation flow of a caller device for call connection requesting callee authentication according to an embodiment of the disclosure.

FIG. 6 illustrates an operation flow of a caller device for call connection requesting callee authentication according to an embodiment of the disclosure.

The caller device illustrates the caller device 310 of FIG. 3, the caller device 410 of FIG. 4, or the caller device 510 of FIG. 5.

Figure 8:
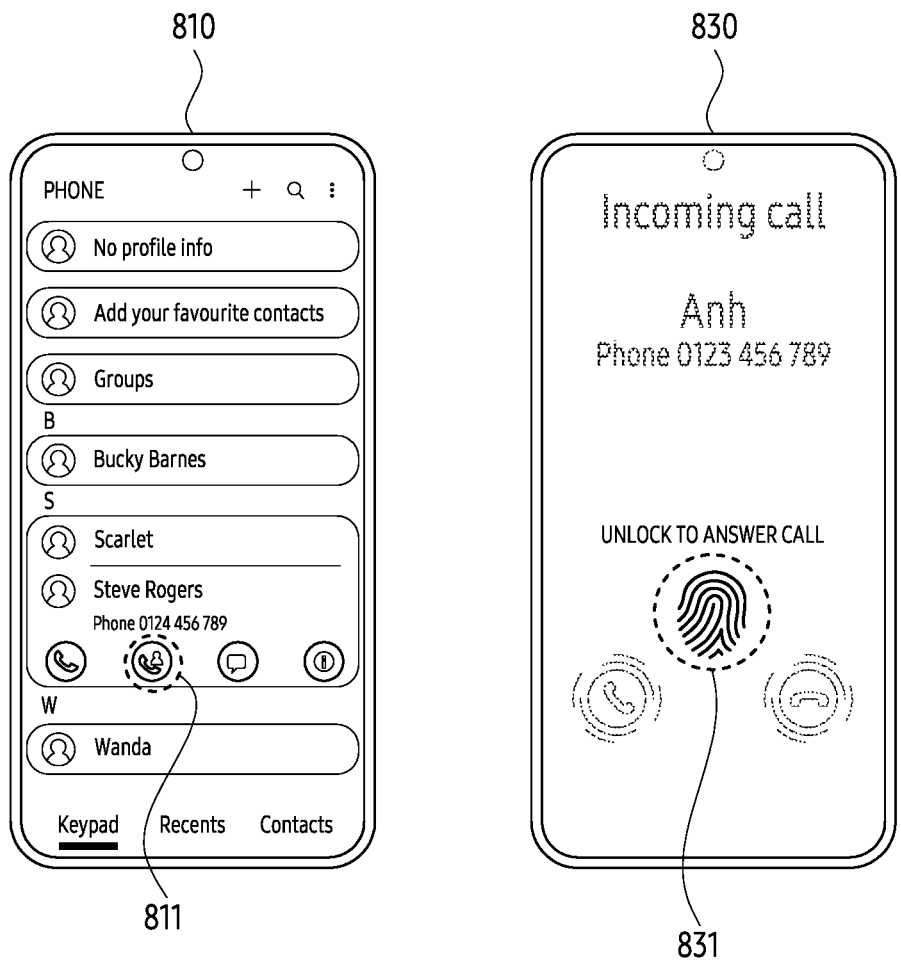
FIG. 8 illustrates an example of a user interface (UI) for a call connection requesting callee authentication according to an embodiment of the disclosure.

Referring to FIG. 6, in operation 601, the caller device may transmit a SIP INVITE message including an authentication request. The caller device may determine to initiate a security call with the callee device. According to an embodiment, the caller device may determine to initiate the security call with the callee device based on the user's input to indicate the security call. For example, as illustrated in FIG. 8, as a touch input is received on an object indicating the security call, the caller device may determine to initiate the security call with the callee device. According to another embodiment, the caller device may determine to initiate the security call with the callee device based on a predefined setting for the callee device. For example, the caller device may determine to initiate the security call with the callee device based on identifying that the callee device is included in a predefined group.

The caller device may generate the SIP INVITE message including the authentication request. The caller device may set an authentication flag in the SIP INVITE message. According to an embodiment, the caller device may set the authentication flag in a header field of the SIP INVITE message. The caller device may write the SIP INVITE message such that the 'Call-info' field of the SIP INVITE message indicates the authentication request.

In operation 603, the caller device may receive the SIP information message for indicating an authentication support. The code of the SIP information message may indicate '181 Ringing'. The callee device may transmit the SIP information message to notify the caller device that the callee device may request authentication from the user according to the caller demand Because the caller device may not want the security call in case that the callee device cannot provide the authentication request to the user. According to an embodiment, the callee device may set the authentication support flag in the header field of the SIP INVITE message. The callee device may write the SIP INVITE message such that the 'Call-info' field of the SIP INVITE message indicates the authentication support.

In operation 605, the caller device may receive the SIP response message according to the authentication completion. The authentication completion means that the authentication is completed in the callee device. Here, the authentication is for confirming that the subject providing the input of the call acceptance in the callee device is the owner of the callee device (or a person authorized by the owner). The SIP response message may indicate that the invite request of the caller device is successful. The code of the SIP response message may indicate '200 OK'. The caller device may identify that the security call is possible with the user of the callee device by receiving the SIP response message indicating the success of the request. The caller device may transmit a confirmation message to the callee device for establishing the security call.

In operation 607, the caller device may establish a session. The caller device may perform the security call with the callee device through the session.

Although FIG. 6 illustrates that the caller device transmits the SIP INVITE message, receives the SIP information message, and receives the SIP response message with one callee device, embodiments of the disclosure are not limited thereto. According to an embodiment, in case that call forwarding is set in the callee device, at least one of the SIP information messages according to operation 603 and the SIP response message according to operation 605 may be received from another callee device. Here, the other callee device is a device different from the callee device that is a destination of the SIP INVITE message, and means a target electronic device for call forwarding. In addition, the caller device may establish the session according to operation 607 with another callee device.

Figure 7:
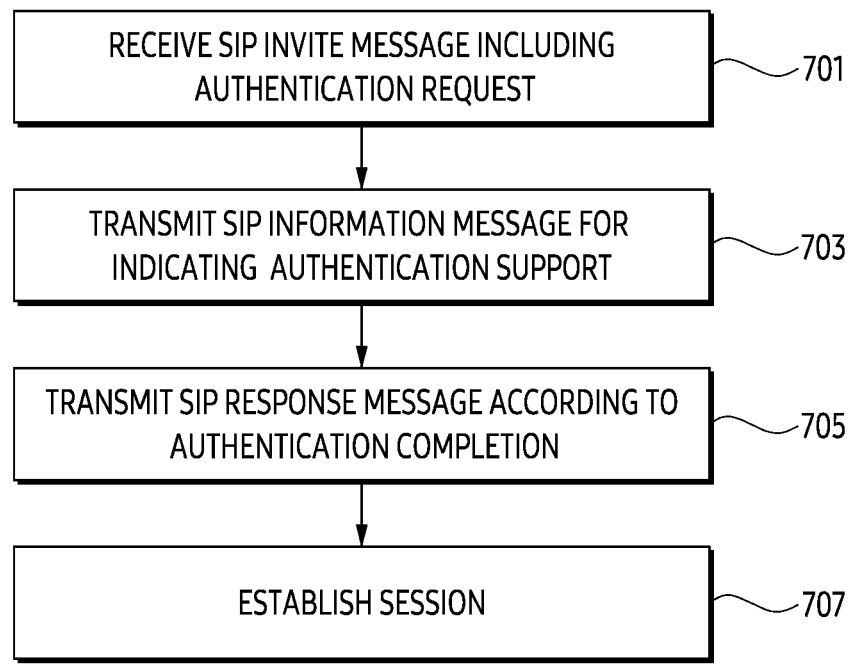
FIG. 7 illustrates an operation flow of a callee device for call connection requesting callee authentication according to an embodiment of the disclosure.

FIG. 7 illustrates an operation flow of a callee device for call connection requesting callee authentication according to an embodiment of the disclosure.

The callee device illustrates the callee device 330 of FIG. 3, the callee device 430 of FIG. 4, and the first callee device 531, the second callee device 532, and the third callee device 533 of FIG. 5.

Referring to FIG. 7, in operation 701, the callee device may receive a SIP INVITE message including an authentication request. The SIP INVITE message may include an authentication flag. The authentication flag may be set in a header field of the SIP INVITE message. A 'Call-info' field of the SIP INVITE message may indicate the authentication request. The callee device may identify that a caller device requires authentication of a user of the callee device.

According to an embodiment, the SIP INVITE message may be transmitted from the caller device through a server. For example, the callee device may be an electronic device indicated by the SIP INVITE message of the caller device. The callee device may receive the SIP INVITE message from the caller device through the server. For another example, the callee device may be a target electronic device (e.g., the second callee device 532 of FIG. 5) according to call forwarding of the first callee device (e.g., the first callee device 531 of FIG. 5). The callee device, which is the target electronic device according to call forwarding, may receive the forwarded SIP INVITE message from the server.

According to an embodiment, the callee device may identify whether to support authentication according to the caller demand in response to reception of the SIP INVITE message. Because, a user input for authentication of the callee device cannot be received, if the callee device does not support the authentication function. For example, if the user input for authentication of the callee device is not received in a UI for an incoming call, it is difficult to complete authentication.

According to an embodiment, the callee device may identify whether an authentication method is set in response to reception of the SIP INVITE message. Because it is difficult to receive the user input for authentication of the callee device if the authentication method within the callee device is not set (e.g., password not set, lock screen not set).

In operation 703, the callee device may transmit a SIP information message indicating an authentication support. The code of the SIP information message may indicate '181 Ringing'. Authentication according to the caller demand may be performed during the call session establishment procedure. In other words, authentication may be requested from a callee before the session is established, and the session establishment may be performed only when authentication is successful. Accordingly, the callee device is required to notify the caller whether authentication is supported. According to an embodiment, in case that the callee device supports callee authentication according to the caller demand (e.g., support authentication function, authentication method is set), the callee device may generate the SIP information message including information indicating the authentication support. The callee device may set an authentication support flag in the header field of the SIP INVITE message. The callee device may write the SIP INVITE message such that the 'Call-info' field of the SIP INVITE message indicates the authentication support.

In operation 705, the callee device may transmit a SIP response message according to the authentication completion. The authentication completion means that the authentication is completed in the callee device. Here, the authentication is for confirming that the subject providing the input of the call acceptance in the callee device is the owner of the callee device (or a person authorized by the owner). The SIP response message may indicate that the invite request of the SIP INVITE message in operation 701 is successful. The code of the SIP response message may indicate '200 OK'. The caller device may identify that the security call is possible with the user of the callee device by receiving the SIP response message indicating the success of the request.

In operation 707, the callee device may establish the session. The callee device may receive a confirmation message from the caller device. The confirmation message is a response to the SIP response message in operation 705. The callee device may perform the security call with the caller device through the session.

Unlike illustrated in FIG. 7, in case that the callee device does not support the function of callee authentication according to the caller demand, or in case that the authentication method is not set in the callee device, the callee device may generate the SIP information message that does not include an authentication status. As described in FIG. 4, whether to maintain the security call may be determined according to a selection of user of the caller device.

FIG. 8 illustrates an example of a user interface (UI) for a call connection requesting callee authentication according to an embodiment of the disclosure.

Referring to FIG. 8, the UI of the caller device 810 may include the object 811 for a security call. The security call may mean a call on which callee authentication is premised according to a caller demand according to embodiments. In order to confirm the identity of the callee, the caller device 810 may request authentication before a session is established. In order to distinguish the security call from a normal call, the UI for a call may include the object 811 for the security call. For example, as illustrated in FIG. 8, the object 811 for the security call may be displayed for each callee object of a callee list in a contact application. In case that a touch input is received on the object 811, the caller device 810 may make the security call to the callee device 830. Based on detection of the touch input on the object 811, the caller device 810 may transmit a SIP INVITE message including an authentication request to callee device 830.

Meanwhile, unlike illustrated in FIG. 8, an input for the security call may be set in a different manner from the touch input to the object 811. According to an embodiment, when the touch input is received on a phone icon, it may be displayed through an additional pop-up. Based on the detection of the additional touch input on the additional pop-up, the caller device 810 may make the security call to the callee device 830. According to another embodiment, the security call may be preset in the call menu. The caller device 810 may make the security call to the callee device 830 according to predefined user preferences.

The UI of the callee device 830 may include the authentication area 831 for the security call. When the caller device 810 makes the security call to the callee device 830, the callee device 830 may display a call UI for the security call. The callee device 830 may identify an authentication flag included in the SIP INVITE message. The callee device 830 may display the call UI for the security call based on the authentication flag included in the SIP INVITE.

According to an embodiment, the call UI for the security call may be distinguished from the call UI for the normal call. The call UI for the normal call may include a user experience (UX) screen for inputting acceptance or rejection of the connection request. The call UI for the security call may include the UX screen for requesting authentication of the user of the callee device 830. A part of the screen of the call UI for the security call may include the authentication area 831. The authentication area 831 may include a fingerprint-shaped object for receiving a fingerprint input. When the fingerprint input is received in the authentication area 831 of the callee device 830, the callee device 830 may identify whether the stored fingerprint information matches the received fingerprint input. In case that the stored fingerprint information matches the received fingerprint input, the callee device 830 may change the screen of the callee device 830 to the UX screen for inputting acceptance or rejection of the connection request.

Unlike illustrated in FIG. 8, the call UI for the security call may be designed in a different manner from the authentication area 831. According to an embodiment, the authentication method may include the input of the password. The call UI for the security call may include the UX screen for inputting the password. According to another embodiment, the authentication method may include a pattern input. The call UI for the security call may include the UX screen for the pattern input. According to another embodiment, the authentication method may include iris recognition. The call UI for the security call may include the UX screen for the iris recognition.

In FIG. 8, it is described that the UI for inquiring whether to accept the call is displayed after authentication is completed, but embodiments of the disclosure are not limited thereto. According to an embodiment, when the input of call acceptance is received in the UI for the normal call, the callee device 830 may display the UX screen requesting user authentication. In other words, the connection of the security call may be performed only through an authenticated user. According to an embodiment, after the input of the call acceptance or the input of the call rejection is received in the UI for the normal call, the callee device 830 may display the UX screen requesting user authentication. In other words, a response to the security call may be performed only through the authenticated user.

The SIP protocol according to embodiments of the disclosure is defined in RFC 3261. Referring to RFC 3261, the 'Call-Info' header field may provide additional information about the caller device or the callee device depending on whether it is found in a request or response. SIP messages for authentication according to the caller demand according to embodiments of the disclosure may use the 'Call-Info' header field.

The 'Call-Info' header field defines two objective values (e.g., tokens) and one general parameter. The first objective value is 'jcard', and may be used to connect call data (e.g., rich call data (RCD)) related to the caller's ID. The second objective value is 'jmin', and may be used to transmit a defined parameter instead of the URI value. The general parameter is 'call-reason' and is used to provide a string or other object. The string or object may be used to convey the intention or reason for making the call so that the caller device may better understand the context of the call of the callee device and the reason for answering the call. In other words, the "call-reason" parameter is intended to convey a short text message suitable for displaying to the end user during a call alert. Referring to RFC 2119, a message including 'call-reason' should not exceed 160 characters (SHOULD). The display of the caller device or callee device that supports 'call-reason' may forcefully truncate messages that do not fit the screen. The message may convey the intention of the caller to contact the callee. According to an embodiment, the caller device may transmit the message including 'call-reason' to the callee device. The 'call-reason' parameter is an optional parameter.

According to an embodiment, the SIP INVITE message transmitted from the caller device to the callee device may be configured as shown in Table 1 below. The SIP INVITE message may include the header field. The parameter 'call-reason' of 'call-info' of the header field may indicate authentication required.

TABLE 1

Authentication SIP INVITE
INVITE sip:bob@biloxi.com SIP/2.0
Via: SIP/2.0/UDP pc33.atlanta.com;branch=z9hG4bK776asdhds
Max-Forwards: 70
To: Bob <sip:bob@biloxi.com>
From: Alice <sip:alice@atlanta.com>;tag=1928301774
Call-ID: a84b4c76e66710@pc33.atlanta.com
CSeq: 314159 INVITE
Contact: <sip:alice@pc33.atlanta.com>
Content-Type: application/sdp
Content-Length: 142
Call-info: call-reason="authentication required"

According to an embodiment, the SIP information message transmitted from the callee device to the caller device may be configured as shown in Table 2 below. The SIP information message may include the header field. The parameter 'call-reason' of the 'Call-info' of the header field may indicate authentication support.

TABLE 2

Authentication SIP 180 RINGING
SIP/2.0 180 Ringing
Via: SIP/2.0/TCP client.atlanta.example.com:5060;branch=z9hG4bK74bf9
;received=192.0.2.101
From: Alice ;tag=9fxced76sl
To: Bob ;tag=8321234356
Call-ID: 3848276298220188511@atlanta.example.com
CSeq: 1 INVITE
Contact:
Content-Length: 0
Call-info: call-reason="authentication support"

Hereinafter, a method of requesting authentication from the called party in the IMS call service is proposed through FIGS. 9A and 9B. An operation of the caller device is described in FIG. 9A, and an operation of the callee device is described in FIG. 9B.

Figure 9A:
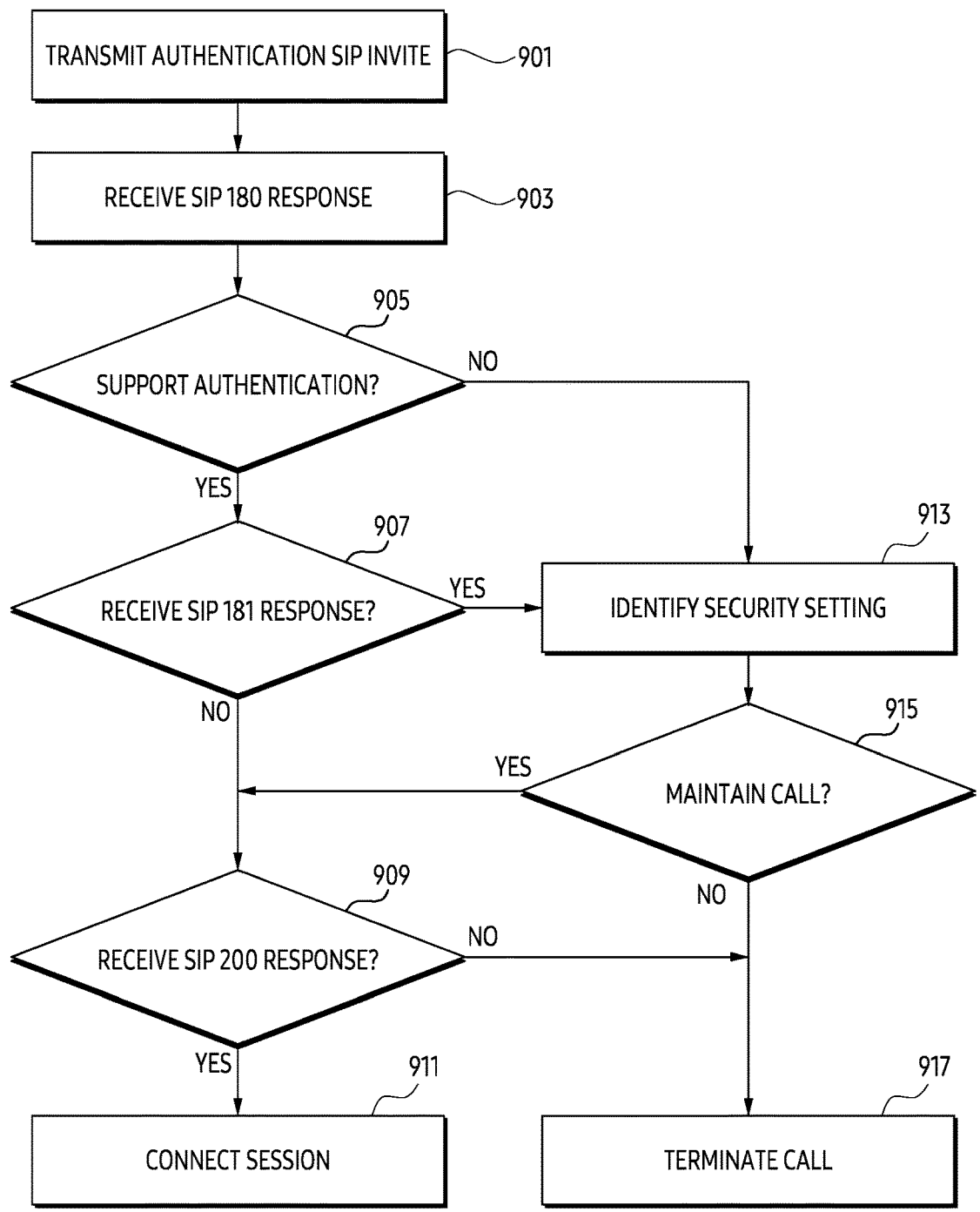
FIG. 9A illustrates an operation flow of a caller device for call connection for requesting callee authentication in a SIP according to an embodiment of the disclosure.

FIG. 9A illustrates an operation flow of a caller device for call connection for requesting callee authentication in a SIP according to an embodiment of the disclosure. The caller device illustrates the caller device 310 of FIG. 3, the caller device 410 of FIG. 4, or the caller device 510 of FIG. 5.

Referring to FIG. 9A, in operation 901, the caller device may transmit an authentication SIP INVITE message. The caller device may transmit an authentication INVITE message to the network to set a security call. The caller device may transmit the authentication SIP INVITE message to the callee device through a server (e.g., the IMS server 521 of FIG. 5 and the proxy server). The authentication SIP INVITE message means a SIP INVITE message including an authentication flag. According to an embodiment, a header field of the SIP INVITE may include information indicating an authentication required (or authentication request). The authentication request included in the SIP INVITE message is to request user authentication from the callee device according to the caller's request. In order to confirm the identity of the user of the callee device, the user authentication (e.g., fingerprint recognition, pattern recognition, and password release) may be required. The caller device may transmit the authentication SIP INVITE message for a connection request of a session for the security call.

In operation 903, the caller device may receive a SIP 180 response. The SIP 180 response indicates ringing a bell on the callee device. According to an embodiment, the SIP 180 response may indicate whether to support callee authentication according to the caller demand in response to reception of the authentication SIP INVITE message. The callee authentication means user authentication in the callee device. According to an embodiment, the SIP 180 response may include the header field indicating authentication support. The value of the header field of the call information may be set to 'authentication support'. In addition, according to an embodiment, the SIP 180 response may include a header field indicating authentication non-support. The authentication non-support may be indicated by not including any information in the value of the header field of the call information.

In operation 905, the caller device may identify whether the callee device supports authentication according to the caller demand. In case that the callee device supports authentication according to the caller demand, the caller device may perform operation 907. In case that the callee device does not support authentication according to the caller demand, the caller device may perform operation 913. If authentication is not supported, the caller device may not want to continue the connection request of the session for the security call any longer. When it is determined that the callee device does not support the authentication method, the caller device may maintain or terminate the call according to user selection.

In operation 907, the caller device may identify whether a SIP 181 response is received. The SIP 181 response indicates call forwarding of the callee device. The SIP 181 response indicates call forwarding of the callee device. The reception of the SIP 181 response means that the target of the authentication SIP INVITE message is forwarded. The caller device may receive the SIP 181 response from the server. In case that the SIP 181 response is received, the caller device may perform operation 915. In case that the SIP 181 response is not received, the caller device may perform operation 909.

In operation 909, the caller device may identify whether a SIP 200 response is received. The SIP 200 response indicates that the connection request of the session is successful. The caller device may receive the SIP 200 response from the server. In case that the call forwarding does not occur, the caller device may receive the SIP 200 response from the callee device through the server. After the call forwarding, the caller device may receive the SIP 200 response through the server from the target electronic device (i.e., the new callee device) of the call forwarding. In case that the SIP 200 response is received, the caller device may perform operation 911. In case that the SIP 200 response is not received, the caller device may perform operation 917.

In operation 911, the caller device may establish a session connection. Thereafter, the caller device may perform communication with the callee device (or the new callee device) through the established session connection. For example, the caller device may perform a call according to the VoIP service with the callee device.

In operation 913, the caller device may identify the security setting. The caller device may identify the security setting in case that the callee device does not support authentication according to the caller demand or receives the SIP 181 response indicating the call forwarding. The security setting may mean a user input or a predefined user setting of the caller device in response to the authentication non-support of the callee device or the call forwarding of the callee device.

According to an embodiment, the caller device may identify from the SIP 180 response of the callee device that the callee device does not support authentication according to the caller demand. The caller device may display a user interface (UI) for inquiring whether to maintain the call to the user of the caller device. The caller device may receive the user input on the UI. According to another embodiment, the caller device may identify the user setting about authentication non-support.

According to an embodiment, the caller device may identify that the current callee device is to be call forwarded to another callee device (i.e., a target electronic device of call forwarding) from the server's SIP 181 response. The caller device may display a UI for inquiring whether to maintain the call with another callee device to the user of the caller device. The caller device may receive the user input on the UI. According to another embodiment, the caller device may identify the user setting about the call forwarding.

In operation 915, the caller device may determine whether to maintain the call. The caller device may determine whether to maintain the call based on the user input or the predefined user setting. The call means a session for the security call. In case that the call is maintained, the caller device may perform operation 909. In case that the call is not maintained, the caller device may perform operation 917.

In operation 917, the caller device may terminate the call. According to an embodiment, the caller device may perform call termination based on not receiving the SIP 200 response. For example, before receiving the SIP 200 response, the caller device may receive a forced termination input of the caller device. For another example, before receiving the SIP 200 response, the caller device may receive an error response or a failure response of the callee device. According to an embodiment, the caller device may perform call termination based on determining not to maintain the call. The caller device may perform call termination since the minimum condition for callee authentication according to the caller demand is not satisfied.

Figure 9B:
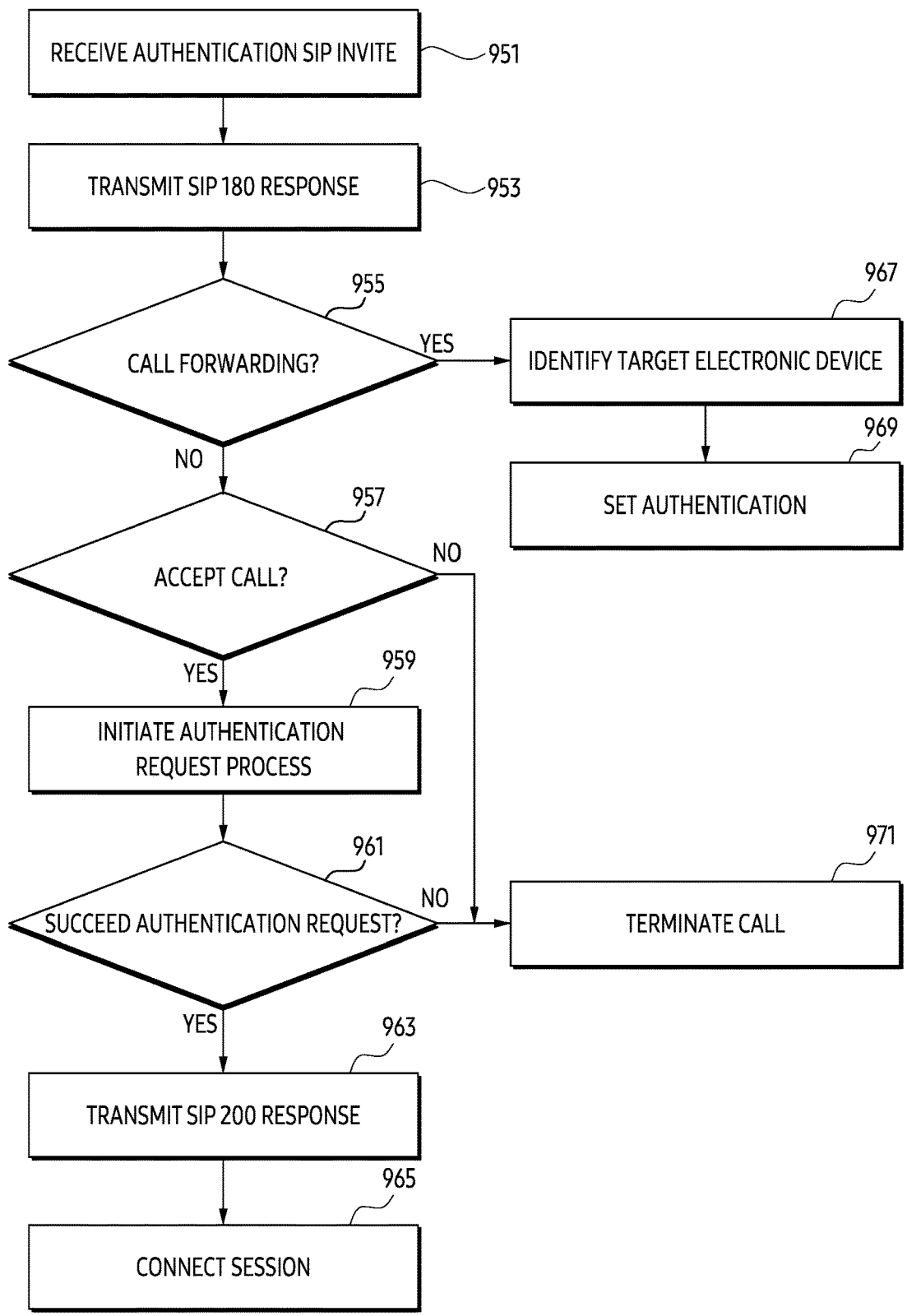
FIG. 9B illustrates an operation flow of a callee device for call connection for requesting callee authentication in a SIP according to an embodiment of the disclosure.

FIG. 9B illustrates an operation flow of a callee device for call connection for requesting callee authentication in a SIP according to an embodiment of the disclosure.

The callee device illustrates the callee device 330 of FIG. 3, the callee device 430 of FIG. 4, and the first callee device 531, the second callee device 532, and the third callee device 533 of FIG. 5.

Referring to FIG. 9B, in operation 951, the callee device may receive an authentication SIP INVITE message. The authentication SIP INVITE message means a SIP INVITE message including an authentication flag. According to an embodiment, a header field of SIP INVITE may include information indicating an authentication required (or authentication request).

In operation 953, the callee device may transmit a SIP 180 response. The SIP 180 response indicates ringing a bell on the callee device. In response to receiving the authentication INVITE message, the callee device may determine an authentication setting. In response to the reception of the authentication INVITE message, the callee device may determine the call forwarding setting.

According to an embodiment, the SIP 180 response may indicate whether to support the callee authentication according to a caller demand in response to reception of the authentication SIP INVITE message. The callee authentication means user authentication in the callee device. A SIP response message may be generated based on whether the callee device supports an authentication function before establishing a session and whether an authentication method is set in the callee device. The callee device may generate the SIP response message including an authentication status in case that the authentication method is set in the callee device and the callee device supports a function of the callee authentication. The authentication status may indicate 'authentication support'.

The callee device may generate the SIP response message that does not include the authentication status in case that the authentication method is not set in the callee device or the callee device does not support the function of the callee authentication. The caller device may identify that the callee device does not support authentication based on identifying that no information is included in the designated header field (e.g., call information ('Call-info' field)).

In operation 955, the callee device may identify whether call forwarding is set to the callee device. In case that the call forwarding is not set in the callee device, the callee device may perform operation 957. In case that the call forwarding is set in the callee device, the callee device may perform operation 967. In case that the call forwarding is activated, the callee device may forward calls by selecting only an electronic device (or terminal) having the authentication method. In case that the call forwarding is not set, the callee device may transmit the SIP 180 response message including information indicating the authentication support.

In operation 957, the callee device may identify whether to accept a call. The callee device may identify whether a user input indicating call acceptance or call rejection is received in order to identify whether to accept a call. In case that the call is accepted, the callee device may perform operation 959. In case that the call is not accepted, the callee device may perform operation 971.

In operation 959, the callee device may initiate an authentication request procedure. The authentication request procedure means callee authentication according to the caller demand. The callee device may request authentication from a user of the callee device. The callee device may display a user interface requiring a designated user input. For example, the designated user input may include fingerprint recognition. For example, the designated user input may include a password. For example, the designated user input may include iris recognition. For example, the designated user input may include a pattern. For example, the designated user input may include face recognition. The callee device may receive the user input received on the user interface. In FIG. 9B, it is illustrated that the callee device requests authentication from the user only in case that the user of the callee device accepts the call, but embodiments of the disclosure are not limited thereto. Even in case that the user of the callee device wants to reject the call, the callee device may request authentication from the user.

In operation 961, the callee device may identify whether the authentication request is successful. The callee device may identify whether the received user input is a designated input in order to identify whether the authentication request is successful. For example, in case that the recognized fingerprint matches the stored fingerprint information, the callee device may identify authentication success. For example, in case that the recognized face matches the stored face information, the callee device may identify authentication success. For example, in case that the recognized iris matches the stored iris information, the callee device may identify authentication success. For example, in case that the input password matches the stored password, the callee device may identify authentication success. For example, in case that the input pattern matches the stored pattern, the callee device may identify authentication success.

In operation 963, the callee device may transmit a SIP 200 response. The SIP 200 response may indicate success with respect to the connection request of the session of the authentication SIP INVITE message in operation 951. According to an embodiment, the callee device may transmit the SIP 200 response based on identifying authentication success. The transmission of the SIP 200 response may indicate the authentication success in the callee device. In other words, the caller device may identify that the authentication of the user of the callee device requested by the caller device has been successfully completed through the reception of the SIP 200 response.

In operation 965, the callee device may establish a session connection. Thereafter, the callee device may perform communication with the caller device through the established session connection. For example, the callee device may perform a call according to the VoIP service with the caller device.

In operation 967, the callee device may identify a target electronic device. In case that call forwarding is set, the callee device may identify the target electronic device for call forwarding. Since the session is related to a security call, callee authentication is also required in the target electronic device. The callee device may identify one or more target electronic devices according to the call forwarding setting. The callee device may identify the status setting of each of the one or more target electronic devices. The status setting indicates whether the corresponding electronic device is in a status in which the callee authentication according to the caller demand is possible according to the embodiments of the disclosure. According to an embodiment, the callee device may identify an electronic device having the authentication method among one or more target electronic devices.

In operation 969, the callee device may perform authentication setting. The callee device may perform authentication setting on the target electronic device for the call forwarding. Due to the authentication setting, the target electronic device may perform a callee authentication procedure according to operations 951 to 965.

In operation 971, the callee device may terminate the call. According to an embodiment, the callee device may perform call termination based on an authentication failure. The authentication failure may indicate that it is difficult for the owner of the callee device to control the recipient device. Since the authentication required by the caller has failed, it is difficult for the callee device to perform the connection procedure of the security call anymore. The callee device may generate the SIP response message notifying the failure or error of the connection request so that the caller device terminates the call. Meanwhile, unlike illustrated in FIG. 9B, according to another embodiment, the caller device may wait until the caller device terminates the call.

According to an embodiment, the callee device may perform the termination of the call based on the call rejection. In case that the user of the callee device does not accept the call, the callee device may initiate the termination of the call regardless of whether the authentication is successful. The callee device may generate the SIP response message notifying the failure or error of the connection request. The callee device may transmit the SIP response message to the caller device.

In FIG. 9B, it is illustrated that after transmitting the SIP 180 response, whether to forward the call is determined, but embodiments of the disclosure are not limited thereto. The operation 953 may be omitted or the operation 953 may be performed after the operation 955 according to the setting of the callee device.

In case that call forwarding is activated in the callee device, the callee device may forward calls by selecting only a terminal having the authentication method. In case that there is no call forwarding, the callee device may transmit the SIP 180 response message including authentication support status. In response to the determination that the user of the callee device wants to accept or reject the call, the callee device may request authentication from the user. When it is determined that the callee device does not support the authentication method, the caller device may maintain or terminate the call according to the user selection of the caller device. Hereinafter, through FIGS. 10A and 10B, a processing method in which the security call requiring the callee authentication according to the caller demand and a call forwarding function are integrated is described. An operation of the caller device is described in FIG. 10A, and an operation of the callee device is described in FIG. 10B. Additional logic for call forwarding may be implemented at the electronic device (caller device or callee device) or at the network side.

Figure 10A:
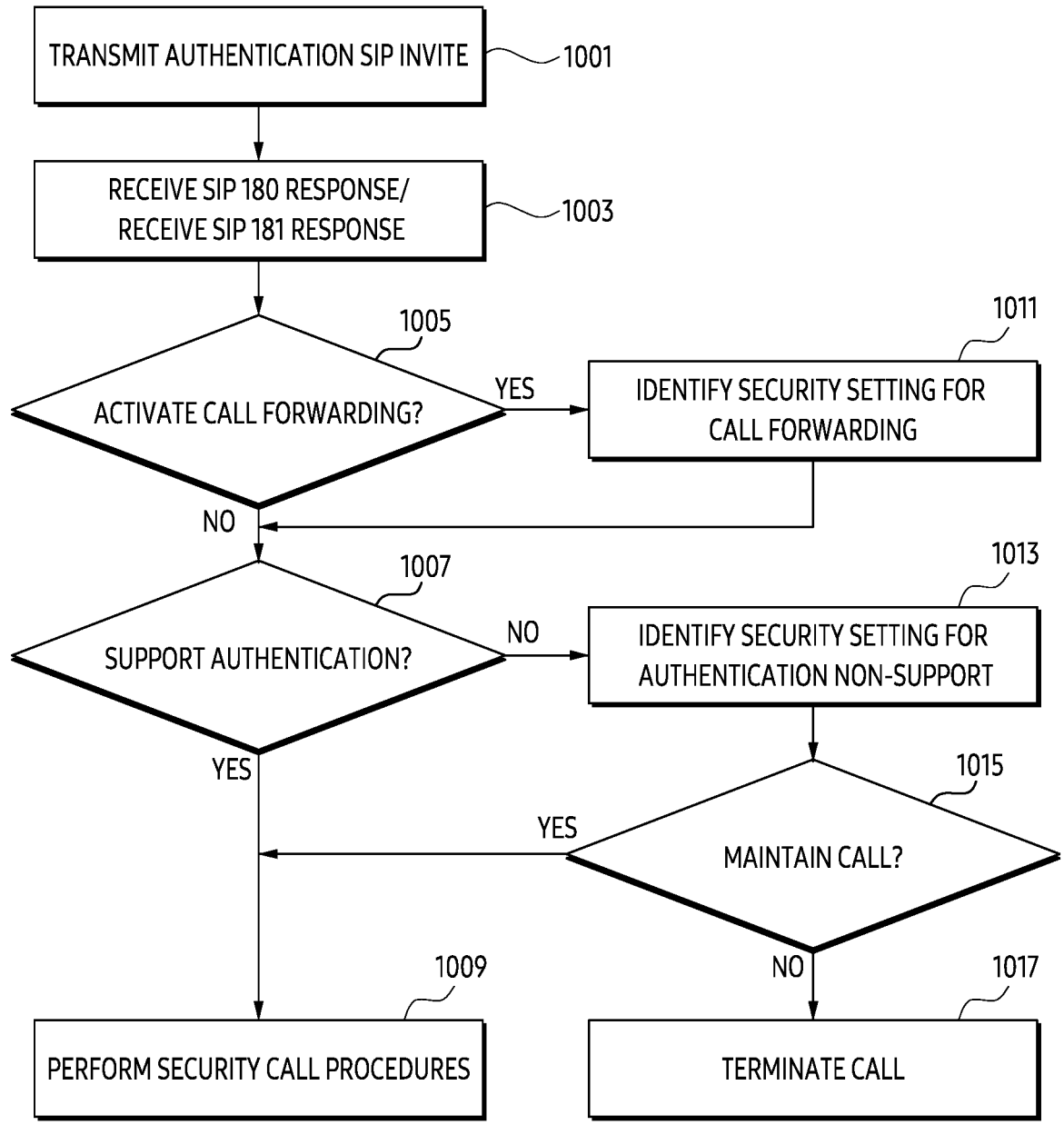
FIG. 10A illustrates an operational flow of a caller device for an authentication procedure upon call forwarding in a SIP according to an embodiment of the disclosure.

FIG. 10A illustrates an operational flow of a caller device for an authentication procedure upon call forwarding in a SIP according to an embodiment of the disclosure.

The caller device illustrates the caller device 310 of FIG. 3, the caller device 410 of FIG. 4, or the caller device 510 of FIG. 5.

Referring to FIG. 10A, in operation 1001, the caller device may transmit an authentication SIP INVITE message. The authentication SIP INVITE message means a SIP INVITE message including an authentication flag. According to an embodiment, a header field of the SIP INVITE may include information indicating an authentication required (or authentication request).

In operation 1003, the caller device may receive a SIP 180 response or a SIP 181 response. The SIP 180 response indicates ringing a bell on the callee device. The SIP 181 response indicates the call forwarding of the callee device.

In operation 1005, the caller device may identify whether the call forwarding is activated on the callee device. In case that the call forwarding is activated on the callee device, the caller device may perform operation 1011. In case that the call forwarding is not activated on the callee device, the caller device may perform operation 1007.

In operation 1007, the caller device may identify whether the callee device supports authentication according to the caller demand. In case that the callee device supports authentication according to the caller demand, the caller device may perform operation 1009. In case that the callee device does not support authentication according to the caller demand, the caller device may perform operation 1013.

In operation 1009, the caller device may perform a security call procedure. As described with reference to FIGS. 3 to 9B, the caller device may perform the security call procedure. The security call procedure means a session connection procedure according to authentication of a user of the callee device. Based on the response from the callee device, the sender device may identify whether the user of the callee device is authenticated, and may perform the session connection in case that the user of the callee device is authenticated.

In operation 1011, the caller device may identify a security setting for the call forwarding. The caller device may identify the security setting indicating whether to allow call forwarding for the security call. According to an embodiment, the security setting may indicate allowing of call forwarding. The caller device may determine whether to perform or terminate the session connection based on whether or not the target electronic device for call forwarding supports callee authentication according to the caller demand. The caller device may perform operation 1007 to determine whether to terminate the session connection with the target electronic device for the call forwarding. In FIG. 10A, it is illustrated that operation 1007 is performed after identifying security settings for call forwarding, but embodiments of the disclosure are not limited thereto. According to another embodiment, the caller device may immediately perform operation 1015 after identifying security settings for call forwarding.

In operation 1013, the caller device may identify the security setting for the authenticate non-support.

In operation 1015, the caller device may determine whether to maintain the call. The caller device may determine whether to maintain the call based on the user input or the predefined user setting. The call means a connection for establishing a session of the security call. In case of maintaining the call, the caller device may perform operation 1009. In case of not maintaining the call, the caller device may perform operation 1007.

According to an embodiment, the caller device may determine whether to maintain or cancel the call in response to the call forwarding notification. For example, the caller device may terminate the call in response to receiving the call forwarding notification according to predefined settings. For another example, the caller device may display a UI for receiving a user's input in response to receiving the call forwarding notification. Depending on the user input to the UI, the caller device may maintain the call or cancel the call.

In operation 1017, the caller device may terminate the call. The caller device may perform call termination based on the caller device determining not to maintain the call. The caller device may perform call termination since the minimum condition for callee authentication according to the caller demand is not satisfied.

Figure 10B:
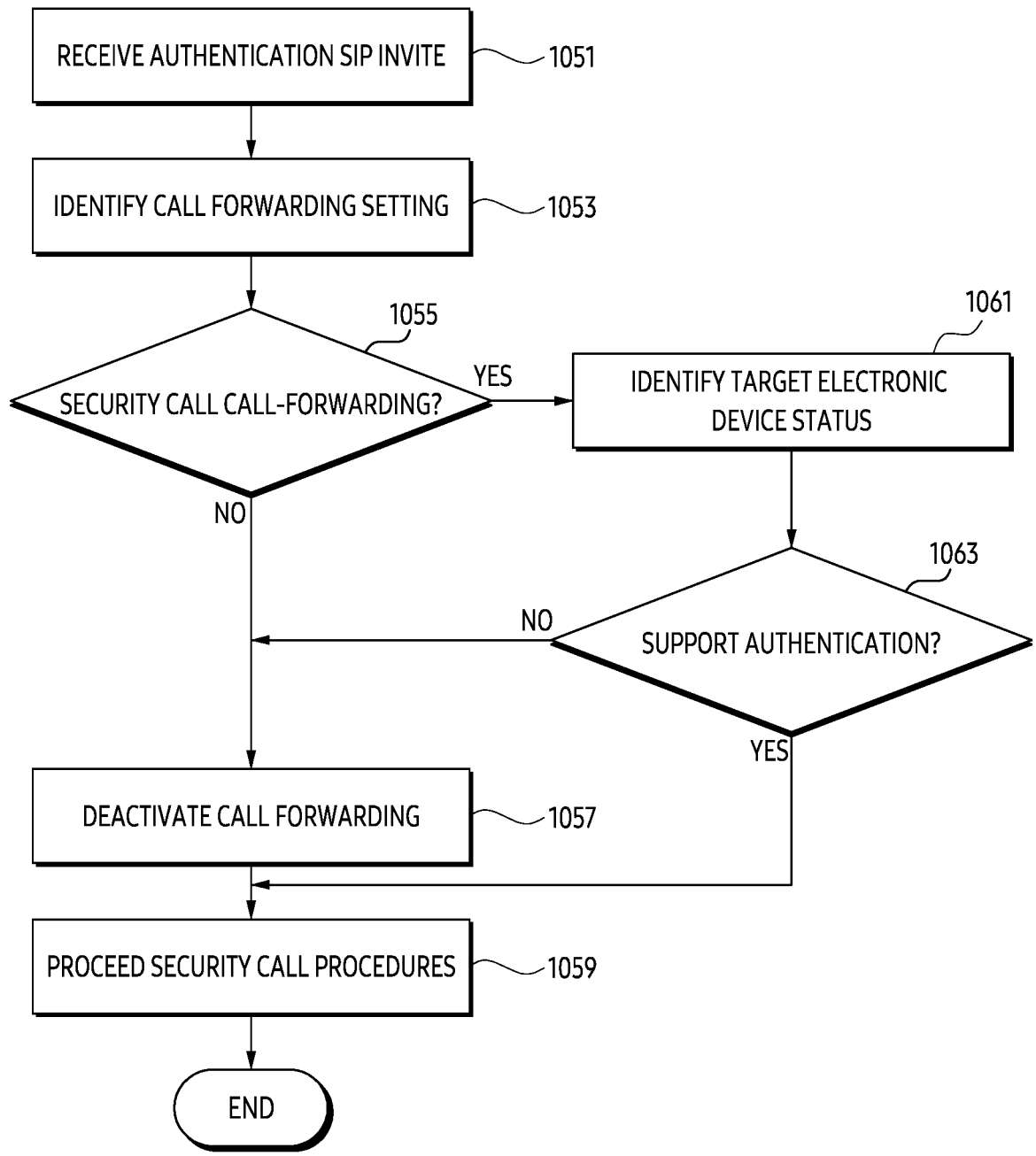
FIG. 10B illustrates an operational flow of a callee device for an authentication procedure upon call forwarding in a SIP according to an embodiment of the disclosure.

FIG. 10B illustrates an operational flow of a callee device for an authentication procedure upon call forwarding in a SIP according to an embodiment of the disclosure.

The callee device illustrates the callee device 330 of FIG. 3, the callee device 430 of FIG. 4, and the first callee device 531, the second callee device 532, and the third callee device 533 of FIG. 5.

Referring to FIG. 10B, in operation 1051, the callee device may receive an authentication SIP INVITE message. The authentication SIP INVITE message means a SIP INVITE message including an authentication flag. According to an embodiment, a header field of the SIP INVITE may include information indicating an authentication required (or authentication request).

In operation 1053, the callee device may identify the call forwarding setting. The callee device may determine the call forwarding settings for the security call. The call forwarding setting means a function of forwarding the call received by the callee device to another device in preparation for a case where the callee device is absent.

In operation 1055, the callee device may identify whether the security call is forwarded. In case that the security call is forwarded, the callee device may perform operation 1061. In case that the security call is not forwarded, the callee device may perform operation 1057. In other words, the callee device may identify whether conditional call forwarding is activated. The device may determine the call forwarding setting for the security call.

In operation 1057, the callee device may deactivate the call forwarding. In case that the call forwarding for the security call is not performed, the callee device may deactivate the call forwarding.

In operation 1059, the callee device may proceed with a security call procedure. As described with reference to FIGS. 3 to 9B, the callee device may perform the security call procedure. The security call procedure means a session connection procedure according to authentication of a user of the callee device. Based on the authentication procedure of the callee device, the callee device may transmit a SIP response message indicating the success of the session connection to the caller device.

In operation 1061, the callee device may identify the status of the target electronic device. The status of the target electronic device may indicate whether callee authentication according to the caller demand according to embodiments of the disclosure is supported in the target electronic device. According to an embodiment, the status of the target electronic device may indicate whether the authentication method is set in the target electronic device. In addition, according to an embodiment, the status of the target electronic device may indicate whether the callee authentication function according to the caller demand according to embodiments of the disclosure is supported in the target electronic device.

In operation 1063, the callee device may identify whether the target electronic device supports the callee authentication. The callee device may identify whether the target electronic device supports the callee authentication based on the status of the target electronic device. When performing call forwarding, the callee device may select an electronic device supporting the authentication method. In case that the target electronic device does not support the callee authentication, the callee device may perform operation 1057. This is because the need for call forwarding is low. In case that the target electronic device supports the callee authentication, the callee device may perform operation 1059. This is because the callee device does not need to deactivate the call forwarding because the target electronic device supports authentication.

According to embodiments of the disclosure, when transmitting the connection request of the session, the caller device requests user authentication from the callee device. Meanwhile, information on whether a call forwarding function is set in the callee device or whether the user authentication function according to the caller demand is supported in the callee device may be managed by a server. Embodiments of the disclosure may also be applied to other deployment types in which the capabilities of each electronic device (or user equipment (UE)) are centrally managed by a server. A call requiring the callee authentication may be referred to as the security call. The server may manage the service of the security call. For example, each electronic device may update information related to the security call to the server. In addition, for example, each electronic device may bring a function related to a security call from the server. Hereinafter, the security call procedure by server management is described through FIGS. 11A and 11B. An operation of the caller device is described in FIG. 11A, and an operation of the callee device is described in FIG. 11B.

Figure 11A:
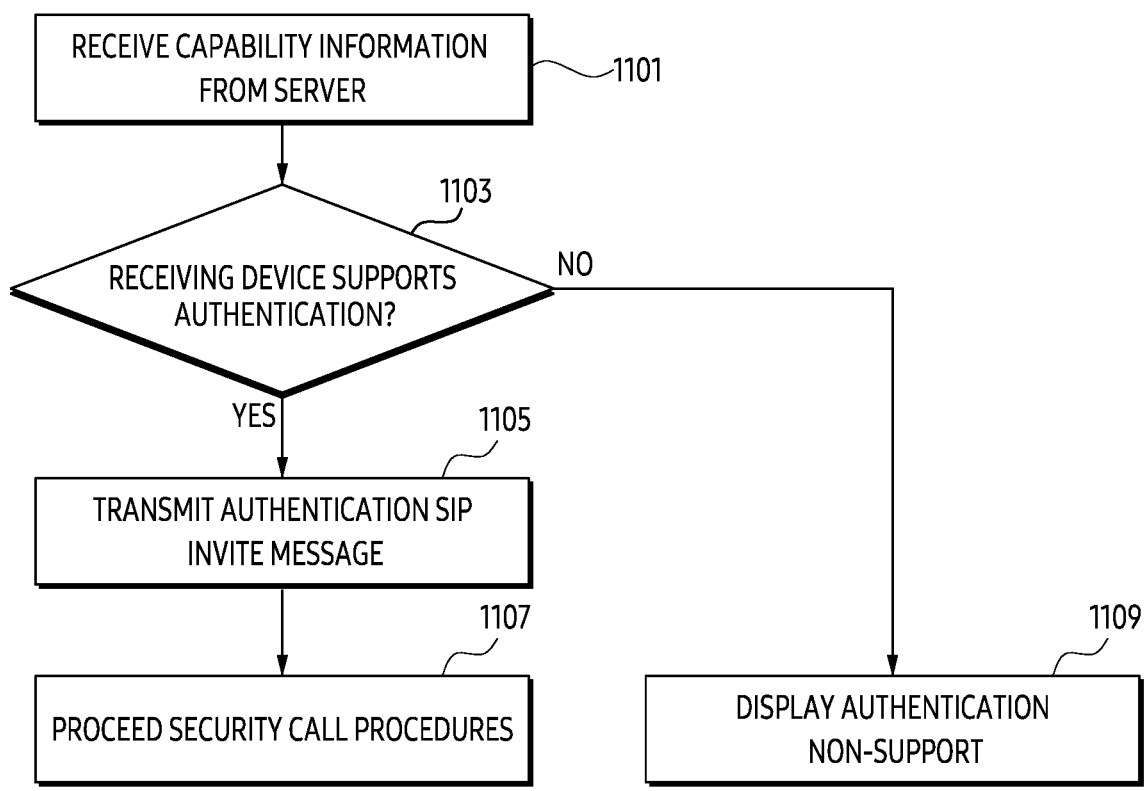
FIG. 11A illustrates an operation flow of a caller device for an authentication procedure using capability information in a SIP according to an embodiment of the disclosure.

FIG. 11A illustrates an operation flow of a caller device for an authentication procedure using capability information in a SIP according to an embodiment of the disclosure.

The caller device illustrates the caller device 310 of FIG. 3, the caller device 410 of FIG. 4, or the caller device 510 of FIG. 5.

Referring to FIG. 11A, in operation 1101, the caller device may receive capability information from a server. The capability information may include information related to authentication support for the callee device. According to an embodiment, the capability information may indicate whether the callee device supports an authentication function. The authentication function may include displaying a designated UI in response to receiving the caller's authentication INVITE message. This is because for callee authentication, about an incoming call, the callee device is required to display a screen requesting authentication to the user before the call is established. According to an embodiment, the capability information may include information related to an authentication method set in the callee device. The capability information may indicate whether the authentication method is set in the callee device. This is because in case that the authentication method is not set in the callee device, it is difficult to proceed with the callee authentication itself.

In operation 1103, the caller device may identify whether the callee device supports authentication. Here, the authentication means user authentication in the recipient device according to a caller demand. In case that the callee device supports authentication, the caller device may perform operation 1105. In case that the callee device does not support authentication, the caller device may perform operation 1109.

In operation 1105, the caller device may transmit an authentication SIP INVITE message. The authentication SIP INVITE message means a SIP INVITE message including an authentication flag. According to an embodiment, a header field of the SIP INVITE may include information indicating an authentication required (or authentication request).

In operation 1107, the caller device may perform a security call procedure. The security call procedure means a session connection procedure according to authentication of a user of the callee device. Based on the response from the callee device, it is possible to identify whether the user of the callee device is authenticated, and to perform the session connection in case that the user of the callee device is authenticated.

In operation 1109, the caller device may display authentication non-support. The user of the caller device may not make a security call to the callee device that does not support authentication. In order for the user of the caller device to recognize the authentication non-support of the callee device, the caller device may display that the callee device that does not support authentication is the authentication non-support.

Figure 11B:
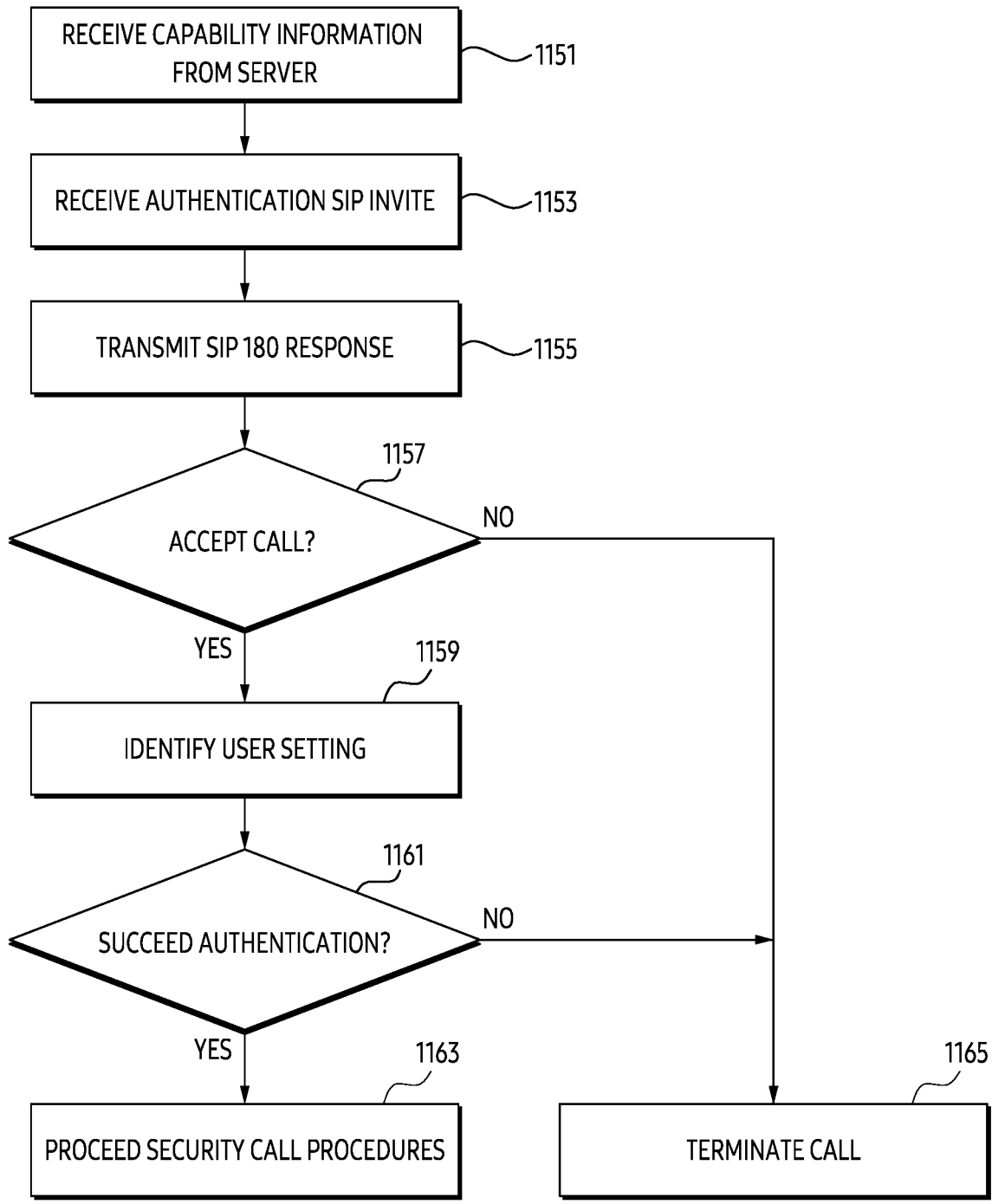
FIG. 11B illustrates an operation flow of a callee device for an authentication procedure using capability information in a SIP according to an embodiment of the disclosure.

FIG. 11B illustrates an operation flow of a callee device for an authentication procedure using capability information in a SIP according to an embodiment of the disclosure.

The callee device illustrates the callee device 330 of FIG. 3, the callee device 430 of FIG. 4, and the first callee device 531, the second callee device 532, and the third callee device 533 of FIG. 5.

Referring to FIG. 11B, in operation 1151, the callee device may receive capability information from the server. The capability information may include information related to the security call of the caller device. According to an embodiment, the capability information may indicate whether the callee authentication according to the caller demand is supported in the caller device. Since the caller device must include an authentication request in an authentication SIP INVITE message, the capability information for the caller device is required. According to an embodiment, the capability information may include a call forwarding policy of the caller device. In case that a call forwarding occurs, if the policy is set not to maintain the security call, the callee device does not need to identify the setting for the target electronic device of the call forwarding.

In operation 1153, the callee device may receive the authentication SIP INVITE message. The authentication SIP INVITE message means a SIP INVITE message including an authentication flag. According to an embodiment, a header field of the SIP INVITE may include information indicating an authentication required (or authentication request).

In operation 1155, the callee device may transmit a SIP 180 response. The SIP 180 response indicates ringing a bell on the callee device. According to an embodiment, the callee device may generate a SIP 180 response message indicating support of an authentication function in order to transmit the SIP 180 response. The callee device may generate the SIP 180 response message based on the capability information received in operation 1151. Based on the capability information of the caller device, a format of a message that should be generated to indicate that the callee device supports the authentication function may be defined.

In operation 1157, the callee device may determine whether to accept a call. The callee device may perform operation 1159 of determining call acceptance. The callee device may perform operation 1165 in case of rejecting the call.

In operation 1159, the callee device may identify a user setting. The user setting means a user input for the authentication request. The callee device may identify an authentication method. The callee device may perform the authentication request to the user. According to an embodiment, the callee device may display a UI requesting authentication to the user. For example, the UI may include an authentication area for fingerprint recognition. In addition, for example, the UI may include an authentication area for iris recognition. In addition, for example, the UI may include a screen for inputting a password. In addition, for example, the UI may include a screen for inputting a pattern. The callee device may identify the user setting according to the authentication request.

In operation 1161, the callee device may identify whether authentication is successful. According to an embodiment, the callee device may identify whether authentication is successful based on the user setting. For example, the callee device may identify whether a fingerprint input according to the user setting matches stored fingerprint information in order to identify whether authentication is successful. For another example, the callee device may identify whether a password input according to the user setting matches stored password information in order to identify whether authentication is successful. For still another example, the callee device may identify whether an iris input according to the user setting matches stored iris information in order to identify whether authentication is successful. For still another example, the callee device may identify whether a pattern input according to the user setting matches stored pattern information in order to identify whether authentication is successful. According to another embodiment, the callee device 1230 may identify authentication success based on whether an authentication timer (e.g., the timer of FIG. 13) expires. If the timer is before expiration, the callee device 1230 may determine that a currently valid authentication result exists. The callee device 1230 may identify the authentication success since the valid authentication result currently exists.

In operation 1163, the callee device may proceed with a security call procedure. The security call procedure means a session connection procedure according to authentication of a user of the callee device. Based on the authentication procedure of the callee device, the callee device may transmit a SIP response message indicating the success of the session connection to the caller device.

In operation 1165, the callee device may terminate the call. According to an embodiment, the callee device may receive a call rejection input. The user of the callee device may not accept the call. In this case, the callee device may terminate the call regardless of whether authentication is successful. According to an embodiment, the callee device may perform call termination based on an authentication failure. The authentication failure may indicate that it is difficult for the owner of the callee device to control the callee device. Since the authentication required by the caller has failed, it is difficult for the callee device to perform the connection procedure of the security call anymore. The callee device may generate the SIP response message notifying the failure or error of the connection request so that the caller device terminates the call. Meanwhile, unlike illustrated in FIG. 11, according to another embodiment, the caller device may wait until the caller device terminates the call.

In FIGS. 3 to 11B, the authentication SIP INVITE message is described to request the security call. In order to generate the authentication SIP INVITE message, the caller device includes information for the authentication request in the SIP INVITE message. However, according to another embodiment, the authentication SIP INVITE message may be generated by the server. Hereinafter, a method for the server to initiate an authentication procedure is described through FIG. 12.

Figure 12:
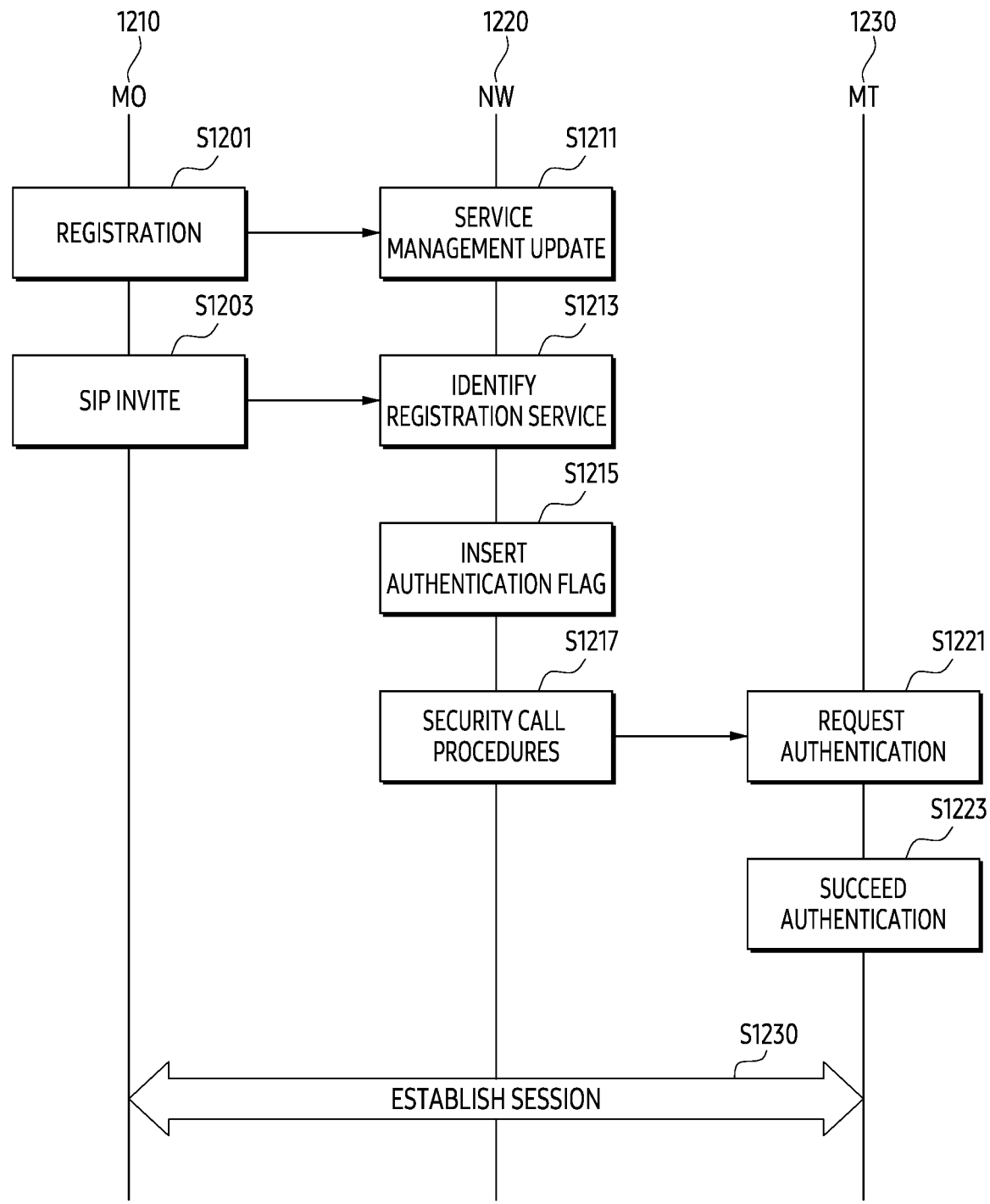
FIG. 12 illustrates an example of signaling for an authentication procedure using a server in SIP according to an embodiment of the disclosure.

FIG. 12 illustrates an example of signaling for an authentication procedure using a server in SIP according to an embodiment of the disclosure.

The callee's electronic device is a mobile termination (MT) and may be referred to as a callee device. The caller's electronic device is a mobile originator (MO) and may be referred to as a caller device. The callee device and the caller device illustrate the electronic device 101. As a network entity for relaying a message between the caller device and the callee device, a server may be used.

Referring to FIG. 12, the caller device 1210 may make a call to the callee device 1230. In this case, a callee authentication request according to embodiments of the disclosure may be performed by the server 1220.

In operation S1201, the caller device 1210 may perform registration to the server. The caller device 1210 may register the caller device 1210 to the server. The caller device 1210 may register a service of the caller device 1210 to the server. The caller device 1210 may register the status of the caller device 1210 to the server. According to an embodiment, when requesting a call connection to a specific callee device (e.g., the callee device 1230), the caller device 1210 may register information indicating that authentication is required to the server. According to an embodiment, when requesting connection of the security call, the caller device 1210 may register information indicating that authentication is required to the server. The caller device 1210 may register information related to the type of the security call to the server so that the determination of whether it is the security call may be performed by the server.

In operation S1203, the caller device 1210 may transmit a SIP INVITE message. The caller device 1210 may transmit the SIP INVITE message to make a call to the callee device. The SIP INVITE message of the caller device 1210 may not include an authentication request. In FIG. 12, since the authentication request is initiated by the server, the caller device 1210 may transmit the SIP INVITE message without inserting separate authentication request information.

In operation S1211, the server 1220 may perform a service management update. The server 1222 may perform the service management update for the caller device 1210 in response to the registration of operation S1201.

In operation S1213, the server 1220 may identify the registration service. The server 1220 may identify the registration service from the SIP INVITE message received from the caller device 1210. The server 1220 may identify whether the registration service of the caller device 1210 requires the callee authentication based on the SIP INVITE message. If the call connection to the callee device 1230, which is the registration service of the caller device 1210, requires the callee authentication, the server 1220 may determine to request the callee authentication. The server 1220 may identify that the security call is requested from the caller device 1210.

In operation S1215, the server 1220 may insert an authentication flag. The server 1220 may rewrite the SIP INVITE message. The server 1220 may insert the authentication flag into the SIP INVITE message received from the caller device 1210. According to an embodiment, the authentication flag may be added to an already existing header (e.g., Call-info) or to a newly defined header for the security call.

In operation S1217, the server 1220 may perform a security call procedure. The server 1220 may transmit the SIP INVITE message into which the authentication flag is inserted, that is, an authentication SIP INVITE message to the callee device 1230. The server 1220 may transmit the authentication SIP INVITE message to request authentication to a user of the callee device.

In operation S1221, the callee device 1230 may perform the authentication request. The callee device 1230 may perform the authentication request to the user. In response to receiving the SIP INVITE authentication, the callee device 1230 may request the user to authenticate for accepting the call. According to an embodiment, the callee device 1230 may display a UI requesting authentication to the user. In addition, according to an embodiment, the callee device 1230 may identify whether a currently valid authentication result exists.

In operation S1223, the callee device 1230 may identify the authentication success. According to an embodiment, in case of receiving a designated input in the UI, the callee device may identify the authentication success. The designated input means an input that matches information stored in the callee device 1230 or the network connected to the callee device 1230. According to an embodiment, the callee device 1230 may identify the authentication success based on whether an authentication timer (e.g., the timer of FIG. 13) expires. If the timer is before expiration, the callee device 1230 may determine that a currently valid authentication result exists. The callee device 1230 may identify the authentication success since the valid authentication result currently exists.

In operation S1230, the callee device 1230 may establish a session with the caller device 1210. In response to the authentication success, the callee device 1230 may transmit a SIP response message (e.g., SIP 200 OK) indicating the success of the connection request of the session to the caller device 1210. The caller device 1210 may transmit a confirmation message to the callee device 1230 in response to receiving the SIP response message. Thereafter, a media session between the caller device 1210 and the callee device 1230 may be established through the server 1220.

Figure 13:
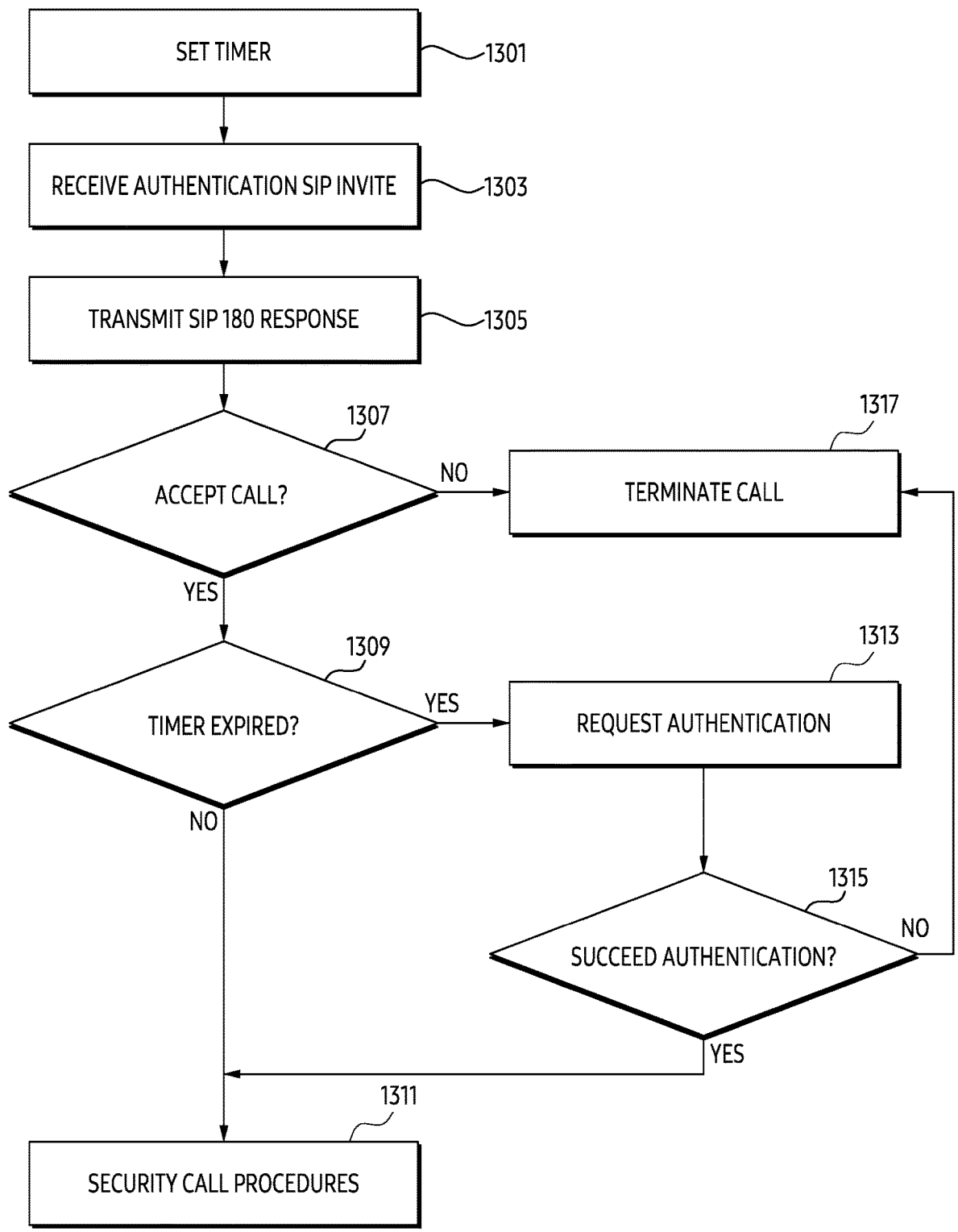
FIG. 13 illustrates an operation flow of a callee device for caller demand-based authentication using a timer, according to an embodiment of the disclosure.

FIG. 13 illustrates an operation flow of a callee device for caller demand-based authentication using a timer, according to an embodiment of the disclosure.

Referring to FIG. 13, a method of operating a timer to optimize an authentication operation in a callee device is described. When a security call comes within a specified time (e.g., a length of a timer) after the success of the last authentication, the callee device may skip an authentication request. The timer may be used to reduce overhead due to repeated authentication procedures. The callee device illustrates the callee device 330 of FIG. 3, the callee device 430 of FIG. 4, and the first callee device 531, the second callee device 532, and the third callee device 533 of FIG. 5.

Referring to FIG. 13, in operation 1301, the callee device may set a timer. The timer may be set based on the success of authentication. Here, the meaning of setting means initiating (or triggering) the timer. According to an embodiment, the callee device may set the timer based on identifying the success of authentication of the user of the callee device.

When one authentication is successful, the timer may be operated. In addition, according to an embodiment, the callee device may set the timer after completion of the security call requiring callee authentication (i.e., after establishment and termination of a session for the security call).

In operation 1303, the recipient device may receive an authentication SIP INVITE message. The authentication SIP INVITE message means a SIP INVITE message including an authentication flag. The authentication flag included in the SIP INVITE message may require user authentication in the callee device.

In operation 1305, the receiver device may transmit a SIP 180 response. The SIP 180 response indicates ringing a bell on the callee device. According to an embodiment, the SIP 180 response may indicate whether to support callee authentication according to a caller demand in response to reception of the authentication SIP INVITE message.

In operation 1307, the callee device may determine whether to accept a call. The callee device may identify whether a user input indicating call acceptance or call rejection is received in order to identify whether to accept a call. In case that the call is accepted, the callee device may perform operation 1309. In case that the call is not accepted, the callee device may perform operation 1317.

In operation 1309, the callee device may identify whether the timer expires. The callee device may identify whether the timer expires in response to a determination that the user accepts the incoming call (i.e., an acceptance input of a call). In case that the timer expires, the callee device may skip the authentication request and accept the call. If it is before the timer expires, the callee device may store a valid authentication result. The callee device may use the valid authentication result for the authentication request. Meanwhile, the expiration of the timer may mean that the valid authentication result is discarded. When the timer expires, the callee device may perform operation S1313. When the timer does not expire, the callee device may perform operation S1311.

In operation 1311, the callee device may perform a security call procedure. The callee device may perform the security call procedure as described through FIGS. 3 to 9B. The security call procedure means a session connection procedure according to authentication of a user of the callee device. Based on an authentication procedure of the callee device, the callee device may transmit a SIP response message indicating the success of the session connection to the caller device.

In operation 1313, the callee device may perform the authentication request. The callee device may perform the authentication request to the user. According to an embodiment, the callee device may display a UI requesting authentication to the user. For example, the UI may include an authentication area for fingerprint recognition. In addition, for example, the UI may include an authentication area for iris recognition. In addition, for example, the UI may include a screen for inputting a password. In addition, for example, the UI may include a screen for pattern input. The callee device may identify the user setting according to the authentication request.

In operation 1315, the callee device may identify whether authentication is successful. According to an embodiment, the callee device may identify whether authentication is successful based on a user setting. For example, the callee device may identify whether the fingerprint input according to the user setting matches the stored fingerprint information in order to identify whether the authentication is successful. For another example, the callee device may identify whether the password input according to the user setting matches the stored password information in order to identify whether the authentication is successful. For still another example, the callee device may identify whether the iris input according to the user setting matches the stored iris information in order to identify whether the authentication is successful. For still another example, the callee device may identify whether the pattern input according to the user setting matches the stored pattern information in order to identify whether the authentication is successful.

In operation 1317, the callee device may terminate the call. According to an embodiment, the callee device may receive a call rejection input in operation 1307. The user of the callee device may not accept the call. The callee device may terminate the call regardless of whether the authentication is successful. According to an embodiment, the callee device may perform call termination based on the authentication failure of operation 1305. The authentication failure may indicate that it is difficult for the owner of the callee device to control the callee device. Since the authentication required by the caller has failed, it is difficult for the callee device to perform the connection procedure of the security call anymore.

In addition to user authentication in the callee device, a password according to a designated protocol between the caller device and the callee device may be used. According to an embodiment, in case that the callee device does not set an authentication method, the password may be used for a processing method of the security call. According to another embodiment, in addition to the user authentication of the callee device, a password may be additionally used. Hereinafter, the security call procedure by server management is described through FIGS. 14A and 14B. An operation of the caller device is described in FIG. 14A, and an operation of the callee device is described in FIG. 14B.

Figure 14A:
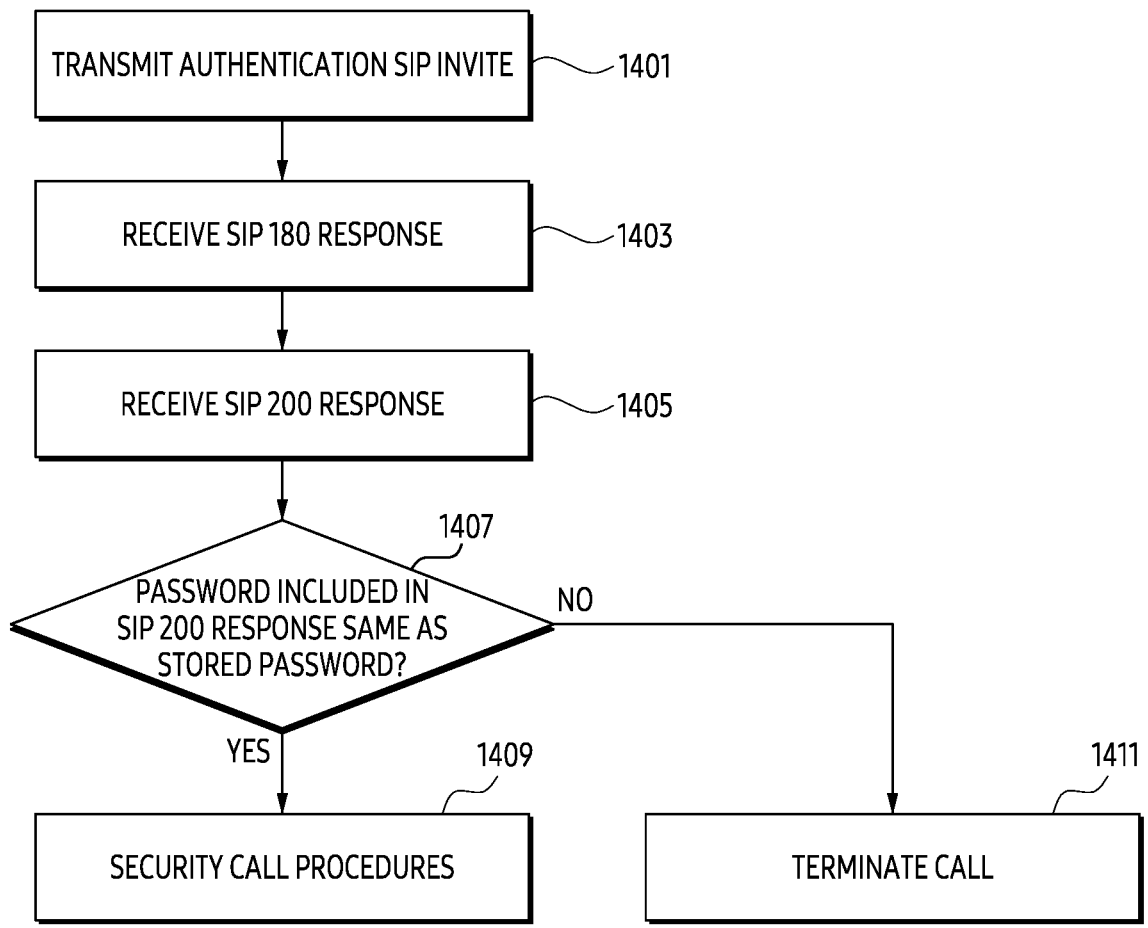
FIG. 14A illustrates an operation flow of a caller device for caller demand-based authentication using a password, according to an embodiment of the disclosure.

FIG. 14A illustrates an operation flow of a caller device for caller demand-based authentication using a password, according to embodiment of the disclosure.

The caller device illustrates the caller device 310 of FIG. 3, the caller device 410 of FIG. 4, or the caller device 510 of FIG. 5.

Referring to FIG. 14A, in operation 1401, the caller device may transmit an authentication SIP INVITE message. The authentication SIP INVITE message means a SIP INVITE message including an authentication flag. According to an embodiment, a header field of the SIP INVITE may include information indicating an authentication required (or authentication request).

In operation 1403, the caller device may receive a SIP 180 response. The SIP 180 response indicates ringing a bell on the callee device. According to an embodiment, the SIP 180 response may indicate whether to support callee authentication according to the caller demand in response to reception of the authentication SIP INVITE message. The callee authentication means user authentication in the callee device. According to an embodiment, the SIP 180 response may include the header field indicating authentication support.

In operation 1405, the caller device may receive a SIP 200 response. The SIP 200 response indicates that the connection request of the session is successful. According to an embodiment, the SIP 200 response may include a password. According to an embodiment, the callee device may transmit the SIP 200 response including the password to the caller device when authentication is successful according to a predetermined protocol. When the caller device receives the SIP 200 response, the caller device may identify that the user authentication of the callee device is successful. The caller device may additionally perform operation 1407 to determine whether the password matches. According to another embodiment, the callee device may preliminarily use a password in case that an authentication method is not set in the callee device. The callee device may include the received password input in the SIP 200 response. When the SIP 200 response is received, the caller device may perform operation 1407 for authentication of the callee.

In operation 1407, the caller device may identify whether the password included in the SIP 200 response is the same as the stored password. In case that the password included in the SIP 200 response is the same as the stored password, the caller device may perform operation 1409. In case that the password included in the SIP 200 response is not the same as the stored password, the caller device may perform operation 1411.

In operation 1409, the caller device may perform a security call procedure. Based on the response from the callee device, the caller device may identify whether the user of the callee device is authenticated or not, and may perform a session connection in case that the user of the callee device is authenticated.

In operation 1411, the caller device may terminate the call. Mismatch of the password means that a security condition is not met. The caller device may determine not to maintain the call. The caller device may perform call termination based on the caller device determining not to maintain the call. Even if the callee authentication is successful, the caller device may perform call termination because the password of the callee device does not match the stored password.

Figure 14B:
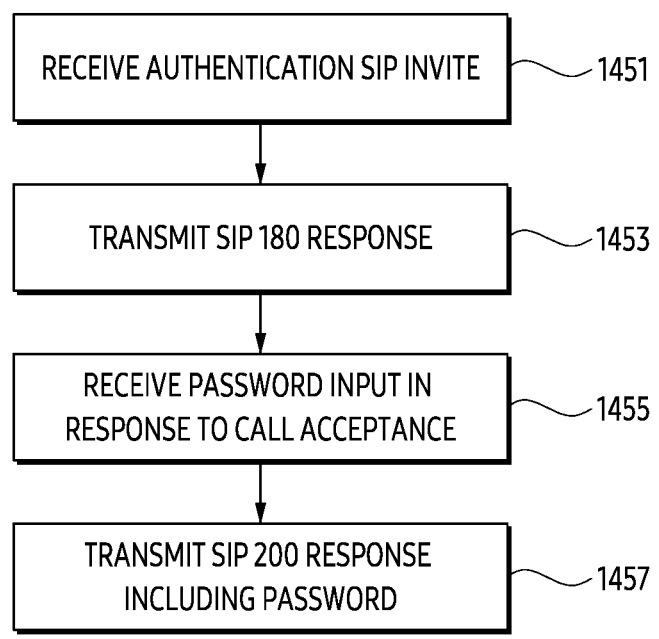
FIG. 14B illustrates an operation flow of a callee device for caller demand-based authentication using a password, according to an embodiment of the disclosure.

FIG. 14B illustrates an operation flow of a callee device for caller demand-based authentication using a password, according to an embodiment of the disclosure.

The callee device illustrates the callee device 330 of FIG. 3, the callee device 430 of FIG. 4, and the first callee device 531, the second callee device 532, and the third callee device 533 of FIG. 5.

Referring to FIG. 14B, in operation 1451, the callee device may receive the authentication SIP INVITE message. The authentication SIP INVITE message means a SIP INVITE message including an authentication flag. According to an embodiment, a header field of the SIP INVITE may include information indicating an authentication required (or authentication request).

In operation 1453, the callee device may transmit a SIP 180 response. The SIP 180 response indicates ringing a bell on the callee device. According to an embodiment, the callee device may generate a SIP 180 response message indicating support of an authentication function in order to transmit the SIP 180 response. The callee device may generate the SIP 180 response message based on the capability information received in operation 1151. Based on the capability information of the caller device, a format of a message that should be generated to indicate that the callee device supports the authentication function may be defined.

In operation 1455, the callee device may receive a password input in response to a call acceptance. When accepting a call, the callee device may expect to receive the password input for authentication according to the caller demand. The callee device may display a UI for the password input. The callee device may receive the password input through the UI. Although not illustrated in FIG. 14B, when accepting a call, the callee device may use a password input procedure along with an authentication procedure. For two-step authentication, the user authentication request described in FIGS. 3 to 13 and the password input procedure for confirming the caller may be performed together.

In operation 1457, the callee device may transmit a SIP 200 response including the password. According to an embodiment, in case that the callee device does not set an authentication method, the password may be used for a processing method of the security call. In response to receiving an authentication INVITE message, the callee device may determine an authentication setting for receiving the password. In response to the user's call acceptance, the callee device may transmit the password input from the user together with the SIP 200 response. According to another embodiment, for additional security of the callee device, in case that authentication is successful in the callee device, the password may be additionally used. In order to request a final confirmation to the caller device, the callee device may transmit the password input from the user together with the SIP 200 response.

Figure 15:
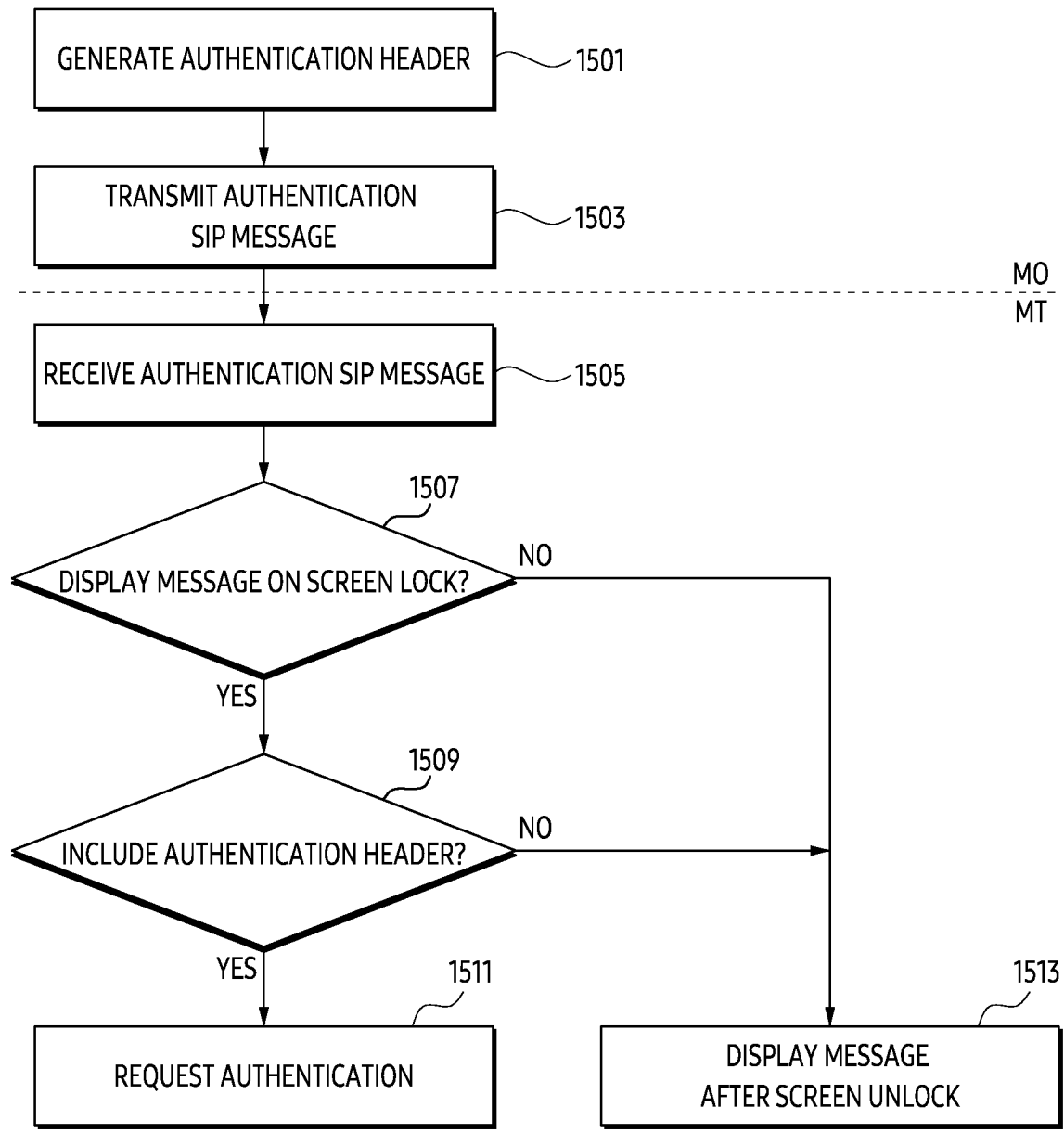
FIG. 15 illustrates an operation flow of a caller device and a callee device for caller demand-based authentication according to a screen lock, according to an embodiment of the disclosure.

FIG. 15 illustrates an operation flow of a caller device and a callee device for caller demand-based authentication according to a screen lock, according to an embodiment of the disclosure.

The SIP message in FIG. 15 may include a short message service (SMS) message for providing text, voice, or video. The caller device illustrates the caller device 310 of FIG. 3, the caller device 410 of FIG. 4, or the caller device 510 of FIG. 5. The callee device illustrates the callee device 330 of FIG. 3, the callee device 430 of FIG. 4, and the first callee device 531, the second callee device 532, and the third callee device 533 of FIG. 5.

Referring to FIG. 15, in operation 1501, the sender device may generate an authentication header. The authentication header may mean a header field of a message in which an authentication flag is set. The caller device may set the authentication flag in the header field in the SIP message in order to request user authentication to the callee device.

In operation 1503, the caller device may transmit an authentication SIP message. The caller device may transmit the authentication SIP message. Here, the authentication SIP message means a SIP message including the authentication flag. According to an embodiment, the SIP message may include the SMS message.

In operation 1505, the callee device may receive the authentication SIP message. According to an embodiment, the authentication SIP message may include an SMS message requiring callee authentication.

In operation 1507, the callee device may identify whether to display the message on the screen lock. The callee device may identify whether to display the message on the screen lock based on the setting of the callee device. The setting of the callee device may indicate whether to display the message on a lock screen. In case of displaying the message on the screen lock, the callee device may perform operation 1509. In case of not displaying the message on the screen lock, callee device may perform operation 1513.

In operation 1509, the callee device may identify whether the SIP message includes the authentication header. In case that the SIP message does not include the authentication header, the callee device may perform operation 1513. In case that the SIP message includes the authentication header, the callee device may perform operation 1511.

In operation 1511, the callee device may perform an authentication request. The callee device may perform the authentication request to the user to identify whether the SMS message content is displayed. The callee device may display a user interface requiring a designated user input. For example, the designated user input may include fingerprint recognition. For example, the designated user input may include a password. For example, the designated user input may include iris recognition. For example, the designated user input may include a pattern. For example, the designated user input may include face recognition. The callee device may receive the user input received on the user interface. In FIG. 15, it is illustrated that the callee device requests authentication from the user only in case that the user of the callee device accepts the call, but embodiments of the disclosure are not limited thereto. Even in case that the user of the callee device wants to reject the call, the callee device may request authentication from the user. According to an embodiment, in case that user authentication is successful, the callee device may display the message on the lock screen.

In operation 1513, the callee device may display the message after unlocking the screen. In case that the callee device is unlocked, the authentication SIP message (e.g., authentication SMS) may be processed as a general message. When the callee device is set to display the content of the message on the lock screen and the user requests to display the authentication message, the callee device may request the user to authenticate.

According to embodiments, a method performed by an electronic device may comprise transmitting, to another electronic device through a server, a session initiation protocol (SIP) INVITE message for a connection request of a session. The SIP INVITE message may include information for indicating an authentication request. The method may include receiving, from the other electronic device through the server, a SIP information message for indicating a ringing. The SIP information message for indicating the ringing may include information for indicating an authentication support. The method may include identifying whether an SIP response message for indicating a success of the connection request is received from the other electronic device or a target electronic device for a call forwarding or not. The method may include establishing the session in response to a reception of the SIP response message. The reception of the SIP response message may indicate an authentication success in the other electronic device or the target electronic device, according to the authentication request.

According to an embodiment, the identifying whether the SIP response message is received may comprise receiving, from the server, SIP information message for indicating the call forwarding for the session. According to an embodiment, the identifying whether the SIP response message is received may comprise based on a user setting for the call forwarding, identifying whether the SIP response message is received from the target electronic device or not.

According to an embodiment, the user setting may indicate to allow the connection request of the session to the target electronic device for the call forwarding.

According to an embodiment, a call-information (Call-info) field of a header of the SIP INVITE message may indicate the authentication request. The SIP information message for indicating the ringing may indicate the authentication support. A code number of the SIP information message for indicating the ringing may be 180. A code number of the SIP information message for indicating the call forwarding may be 181. A code number of the SIP response message may be 200.

According to an embodiment, the method may further comprise receiving a user input for indicating a call termination, in response to a reception of a SIP information message for indicating call forwarding for the session.

According to an embodiment, the method may further comprise in response to the user input, transmitting, to the server, a message requesting the call termination of the connection request of the session.

According to an embodiment, the authentication request may require a designated user input in the other electronic device or the target electronic device for the call forwarding. The designated user input may comprise at least one of a pattern, a password, a fingerprint recognition result, a face recognition result, or an iris recognition result.

According to an embodiment, the establishing the session may comprise identifying password information included in the SIP response message. The establishing the session may comprise establishing the session, based on a validation result of the password information.

According to embodiments, a method performed by an electronic device, may comprise receiving, from another electronic device through a server, a session initiation protocol (SIP) INVITE message for a connection request of a session. The SIP INVITE message may include an authentication request. The method may include transmitting, to the other electronic device through the server, a SIP information message for indicating a ringing. The SIP information message for indicating the ringing may include an authentication support. The method may include receiving a designated user input according to the authentication request. The method may include, based on the designated user input, transmitting, to the other electronic device, a SIP response message for indicating a success of the connection request.

According to an embodiment, a call-information (Call-info) field of a header of the SIP INVITE message may indicate the authentication request. The SIP information message for indicating the ringing may indicate the authentication support. A code number of the SIP information message for indicating the ringing may be 181. A code number of the SIP response message may be 200.

According to an embodiment, the receiving the designated user input may comprise displaying a user interface for the designated input. The designated user input may comprise at least one of a pattern, a password, a fingerprint recognition result, a face recognition result, or an iris recognition result.

According to an embodiment, the SIP response message may comprise password information corresponding to the authentication request.

According to an embodiment, the receiving the user input may comprise displaying a user interface for the designated user input based on identifying that an authentication timer expires. The authentication timer may start when an authentication according to another authentication request received before the authentication request is successful.

According to embodiments, an electronic device may comprise a memory; at least one transceiver; and at least one processor operably coupled to the memory and the at least one transceiver. The at least one processor may be configured to transmit to another electronic device through a server, a session initiation protocol (SIP) INVITE message for a connection request of a session. The SIP INVITE message may include information for indicating an authentication request. The at least one processor may be configured to receive from the other electronic device through the server, a SIP information message for indicating a ringing. The SIP information message for indicating the ringing may include information for indicating an authentication support. The at least one processor may identify whether an SIP response message for indicating a success of the connection request is received from the other electronic device or a target electronic device for a call forwarding or not. The at least one processor may be configured to establish the session in response to a reception of the SIP response message. The reception of the SIP response message may indicate an authentication success in the other electronic device or the target electronic device, according to the authentication request.

According to an embodiment, the at least one processor may be, to identify whether the SIP response message is received or not, configured to receive, from the server, SIP information message for indicating the call forwarding for the session. The at least one processor may be, to identify whether the SIP response message is received or not, configured to, based on a user setting for the call forwarding, identify whether the SIP response message is received from the target electronic device or not.

According to an embodiment, the user setting may indicate to allow the connection request of the session to the target electronic device for the call forwarding.

According to an embodiment, a call-information (Call-info) field of a header of the SIP INVITE message may indicate the authentication request. The SIP information message for indicating the ringing may indicate the authentication support. A code number of the SIP information message for indicating the ringing may be 180. A code number of the SIP information message for indicating the call forwarding may be 181. A code number of the SIP response message may be 200.

According to an embodiment, the at least one processor may be further configured to receive a user input for indicating a call termination, in response to a reception of a SIP information message for indicating call forwarding for the session.

According to an embodiment, the at least one processor may be further configured to in response to the user input, transmit, to the server, a message requesting the call termination of the connection request of the session.

According to an embodiment, the authentication request may require a designated user input in the other electronic device or the target electronic device for the call forwarding. The designated user input may comprise at least one of a pattern, a password, a fingerprint recognition result, a face recognition result, or an iris recognition result.

According to an embodiment, the at least one processor, to establish the session, may identify password information included in the SIP response message. The at least one processor may be, to establish the session, configured to establish the session, based on a validation result of the password information.

According to embodiments, an electronic device may comprise a memory; at least one transceiver; at least one processor operably coupled to the memory and the at least one transceiver. The at least one processor may be configured to receive, from another electronic device through a server, a session initiation protocol (SIP) INVITE message for a connection request of a session. The SIP INVITE message may include an authentication request. The at least one processor may be configured to transmit, to the other electronic device through the server, a SIP information message for indicating a ringing. The SIP information message for indicating the ringing may include an authentication support. The at least one processor may be configured to receive a designated user input according to the authentication request. The at least one processor may be configured to, based on the designated user input, transmit to the other electronic device, a SIP response message for indicating a success of the connection request.

According to an embodiment, a call-information (Call-info) field of a header of the SIP INVITE message may indicate the authentication request. The SIP information message for indicating the ringing may indicate the authentication support. A code number of the SIP information message for indicating the ringing may be 180. A code number of the SIP response message may be 200.

According to an embodiment, the at least one processor may be, to receive the designated user input, configured to display a user interface for the designated input. The designated user input may comprise at least one of a pattern, a password, a fingerprint recognition result, a face recognition result, or an iris recognition result.

According to an embodiment, the SIP response message may comprise password information corresponding to the authentication request.

According to an embodiment, the at least one processor may be, to receive the user input, configured to display a user interface for the designated user input based on identifying that an authentication timer expires. The authentication timer may start when au authentication according to another authentication request received before the authentication request is successful.

The electronic device according to embodiments may include at least one speaker and at least one microphone. The electronic device according to embodiments may include at least one communication circuit for communicating with a network. The electronic device according to embodiments may include a processor operably connected to a speaker and a microphone. The electronic device according to embodiments may include a processor operably connected to the processor. One or more authentication services may be set in the callee device. In response to the authentication request of the caller, an authentication service may be provided in the callee device.

Embodiments of the disclosure may provide various solutions through an authentication method before session establishment in an IMS service. According to an embodiment, the authentication method may be achieved only through a change in the electronic device. According to an embodiment, the authentication method may be used for a VoIP service for an OTT application. According to an embodiment, the authentication method, as a network solution, may be used for a new service of a business operator. According to an embodiment, the authentication method may provide integration with call forwarding and voicemail function. According to an embodiment, the authentication method may provide a security call service in an IoT environment. The authentication method may interwork with the CMC function (Call & Message Continuity). In addition, in the authentication method, when a caller demands a call (i.e., during a session establishment procedure for a call), since authentication of the callee is requested, the privacy of the caller may be protected and the reliability of the session to be established may be increased.

Methods according to the embodiments described in the claims or specifications of the disclosure may be implemented in the form of hardware, software, or a combination of hardware and software.

When implemented in software, a computer readable storage medium storing one or more programs (software modules) may be provided. One or more programs stored in the computer readable storage medium are configured for execution by one or more processors in the electronic device. The one or more programs include instructions that cause the electronic device to execute methods according to embodiments described in the claims or specification of the disclosure.

These programs (software modules, software) may be stored in random access memory, non-volatile memory including flash memory, read only memory (ROM), electrically erasable programmable read only memory (EEPROM), magnetic disc storage device, compact disc-ROM (CD-ROM), digital versatile discs (DVDs) or other form of optical storage, or magnetic cassette. Alternatively, it may be stored in a memory configured as a combination of some or all of them. In addition, a plurality of each configuration memory may be included.

In addition, the program may be stored in an attachable storage device that may be accessed through a communication network such as the Internet, an intranet, a local area network (LAN), a wide area network (WAN), or a storage area network (SAN), or a communication network configured with a combination thereof. Such a storage device may access a device performing an embodiment of the disclosure through an external port. In addition, a separate storage device on the communication network may access a device performing an embodiment of the disclosure.

Based on the discussion as described above, the present disclosure provides a device and a method for establishing a session through authentication in a session initial protocol (SIP).

The present disclosure provides a device and a method for a call service for requesting authentication according to a demand of a caller.

The present disclosure provides a device and a method for providing an authentication procedure using an editable existing header field.

In a device and a method according to embodiments of the present disclosure, an authentication status is provided to a response message of a callee in a session initial protocol (SIP), and thus a call service can be performed at a security level according to a demand of a caller.

The effects that can be obtained from the present disclosure are not limited to those described above, and any other effects not mentioned herein will be clearly understood by those having ordinary knowledge in the art to which the present disclosure belongs, from the following description.

In the specific embodiments of the disclosure described above, components included in the disclosure are expressed in singular or plural numbers according to the specific embodiments presented. However, singular or plural expressions are selected appropriately for the presented situation for convenience of explanation, the disclosure is not limited to singular or plural components, and even if it is a component expressed in plural, it may be configured with singular, or even if it is a component expressed in singular, it may be configured with plural.

Meanwhile, in the detailed description of the present disclosure, specific embodiments have been described, but it goes without saying that various modifications are possible without departing from the scope of the present disclosure.

What is claimed is:

1. A method performed by an electronic device, the method comprising:
    transmitting, to a first external electronic device through a server, a session initiation protocol (SIP) INVITE message for a connection request of a security call session, the SIP INVITE message including information for indicating an authentication request, wherein the authentication request is indicated in a call-information (Call-info) field of a header of the SIP INVITE message;
    receiving, from the first external electronic device through the server, a SIP information message including capability information for indicating whether the first external electronic device supports an authentication function in accordance with the authentication request, wherein support for the authentication function is indicated in a Call-info field of a header of the SIP information message;
    based on identifying that the capability information indicates that the first external electronic device supports the authentication function:
    receiving, through the server, an SIP response message; and
    based on identifying that the SIP response message includes information for indicating an authentication success in the first external electronic device, establishing the security call session; and
    based on identifying that the capability information indicates that the first external electronic device does not support the authentication function, displaying a user interface for inquiring a termination of the security call session.

2. The method of claim 1, further comprising:
    receiving, from the server, SIP information message for indicating call forwarding for the security call session; and
    based on a user setting for the call forwarding, identifying whether SIP response message is received from a second external electronic device or not.

3. The method of claim 2, wherein the user setting indicates allowance of the connection request of the security call session to the second external electronic device for the call forwarding.

4. The method of claim 1, further comprising:
    while displaying the user interface, receiving a user input for maintaining the security call session; and
    displaying, based on the user input for maintaining the security call session, a notification indicating that the security call session is changed to a normal call session.

5. The method of claim 2, further comprising:
    receiving a user input for indicating a call termination, in response to a reception of the SIP information message for indicating the call forwarding for the security call session; and
    in response to the user input for indicating the call termination, transmitting, to the server, a message requesting the call termination of the connection request of the security call session.

6. The method of claim 1, wherein the establishing of the security call session comprises:
    identifying password information included in the SIP response message; and
    establishing the security call session, based on a validation result of the password information.

7. A method performed by an electronic device, the method comprising:
    receiving, from an external electronic device through a server, a session initiation protocol (SIP) INVITE message for a connection request of a session, the SIP INVITE message including an authentication request, wherein the authentication request is indicated in a call-information (Call-info) field of a header of the SIP INVITE message;

transmitting, to the external electronic device through the server, a SIP information message for indicating a ringing, the SIP information message for indicating the ringing including information for indicating that the electronic device supports an authentication function in accordance with the authentication request, wherein support for the authentication function is indicated in a Call-info field of a header of the SIP information message;

display, via a display, a user interface for authentication;

receiving, via the user interface for authentication, a designated user input for authentication according to the authentication request; and based on the designated user input, transmitting, to the external electronic device, a SIP response message for indicating a success of the connection request.

8. The method of claim 7,
wherein a code number of the SIP information message for indicating the ringing is 180, and
wherein a code number of the SIP response message is 200.

9. The method of claim 7, wherein the SIP response message comprises password information corresponding to the authentication request.

10. The method of claim 7,
wherein the receiving the designated user input comprises displaying a user interface for the designated user input based on identifying that an authentication timer expires, and
wherein the authentication timer starts when an authentication, according to another authentication request received before the authentication request, is successful.

11. An electronic device, comprising:
memory storing instructions;
a display;
at least one transceiver; and
at least one processor operably coupled to the memory, the display, and the at least one transceiver,
wherein the instructions, when executed by the at least one processor, cause the electronic device to:
transmit, to a first external electronic device through a server, a session initiation protocol (SIP) INVITE message for a connection request of a security call session, the SIP INVITE message including information for indicating an authentication request, wherein the authentication request is indicated in a call-information (Call-info) field of a header of the SIP INVITE message,
receive, from the first external electronic device through the server, a SIP information message including capability information for indicating that the first external electronic device supports an authentication function in accordance with the authentication request, wherein support for the authentication function is indicated in a Call-info field of a header of the SIP information message,
based on identifying that the capability information indicates that the first external electronic device supports the authentication function:
receive an SIP response message from the first external electronic device, and
based on identifying that the SIP response message includes information for indicating an authentication success in the first external electronic device, establish the security call session, and based on identifying that the capability information indicates that the first external electronic device does not support the authentication function, display, via the display, a user interface for inquiring a termination of the security call session.

12. The electronic device of claim 11, wherein the instructions, when executed by the at least one processor, cause the electronic device to:
receive, from the server, SIP information message for indicating call forwarding for the security call session; and
based on a user setting for the call forwarding, identify whether the SIP response message is received from a second external electronic device or not.

13. The electronic device of claim 12, wherein the user setting indicates allowance of the connection request of the security call session to the second external electronic device for the call forwarding.

14. The electronic device of claim 11, wherein the instructions, when executed by the at least one processor, cause the electronic device to:
while displaying the user interface, receive a user input for maintaining the security call session; and
display, via the display, based on the user input for maintaining the security call session, a notification indicating that the security call session is changed to a normal call session.

15. The electronic device of claim 12, wherein the instructions, when executed by the at least one processor, cause the electronic device to:
receive a user input for indicating a call termination, in response to a reception of the SIP information message for indicating the call forwarding for the security call session; and
in response to the user input for indicating the call termination, transmit, to the server, a message requesting the call termination of the connection request of the security call session.

16. The electronic device of claim 11, wherein, to establish the security call session, the instructions, when executed by the at least one processor, cause the electronic device to:
identify password information included in the SIP response message; and
establish the security call session, based on a validation result of the password information.

17. An electronic device, comprising:
memory storing instructions;
a display;
at least one transceiver; and
at least one processor coupled to the memory, the display, and the at least one transceiver,
wherein the instructions, when executed by the at least one processor, cause the electronic device to:
receive, from an external electronic device through a server, a session initiation protocol (SIP) INVITE message for a connection request of a session, the SIP INVITE message including an authentication request, wherein the authentication request is indicated in a call-information (Call-info) field of a header of the SIP INVITE message,
transmit, to the external electronic device through the server, a SIP information message for indicating a ringing, the SIP information message for indicating the ringing including information for indicating that the electronic device supports an authentication function in accordance with the authentication request, wherein support for the authentication function is indicated in a Call-info field of a header of the SIP information message, display, via the display, a user interface for authentication, receive, via the user interface for authentication, a designated user input for authentication according to the authentication request, and based on the designated user input, transmit, to the external electronic device, a SIP response message for indicating a success of the connection request.

18. The electronic device of claim 17, wherein a code number of the SIP information message for indicating the ringing is 180, and wherein a code number of the SIP response message is 200.

19. The electronic device of claim 17, wherein the SIP response message comprises password information corresponding to the authentication request.

20. The electronic device of claim 17, wherein, to receive the designated user input, the instructions, when executed by the at least one processor, cause the electronic device to:

display a user interface for the designated user input based on identifying that an authentication timer expires, and wherein the authentication timer starts when an authentication, according to another authentication request received before the authentication request, is successful.

* * * * *